United States Patent
Taylor et al.

(10) Patent No.: US 10,928,504 B2
(45) Date of Patent: Feb. 23, 2021

(54) RADAR BASED SEED SENSOR FOR USE WITH AGRICULTURAL SYSTEMS, METHODS, AND APPARATUS

(71) Applicant: Kinze Manufacturing, Inc., Williamsburg, IA (US)

(72) Inventors: Ryan Taylor, Cedar Rapids, IA (US); Dustan Hahn, Williamsburg, IA (US); Scott Porter, Liberty Hill, TX (US)

(73) Assignee: Kinze Manufactoring, Inc., Williamsburg, IA (US)

( * ) Notice: Subject to any disclaimer, the term of this patent is extended or adjusted under 35 U.S.C. 154(b) by 297 days.

(21) Appl. No.: 15/885,189

(22) Filed: Jan. 31, 2018

(65) Prior Publication Data

US 2018/0224537 A1   Aug. 9, 2018

Related U.S. Application Data

(60) Provisional application No. 62/452,703, filed on Jan. 31, 2017.

(51) Int. Cl.
| | | |
|---|---|---|
| *G01S 13/58* | (2006.01) | |
| *A01C 7/08* | (2006.01) | |
| *A01C 7/10* | (2006.01) | |
| *A01C 7/20* | (2006.01) | |
| *G01S 13/88* | (2006.01) | |
| *G01S 13/50* | (2006.01) | |
| *A01C 7/04* | (2006.01) | |

(52) U.S. Cl.
CPC .............. *G01S 13/58* (2013.01); *A01C 7/08* (2013.01); *A01C 7/105* (2013.01); *A01C 7/206* (2013.01); *G01S 13/50* (2013.01); *G01S 13/88* (2013.01); *A01C 7/04* (2013.01)

(58) Field of Classification Search
CPC ........... A01C 7/105; A01C 7/206; A01C 7/08; G01S 13/58; G01S 13/88
See application file for complete search history.

(56) References Cited

U.S. PATENT DOCUMENTS

| 4,239,010 A | 12/1980 | Amburn |
| 4,246,469 A | 1/1981 | Merlo |

(Continued)

FOREIGN PATENT DOCUMENTS

| DE | 10338005 A1 | 3/2005 |
| EP | 2520148 A2 | 4/2012 |

OTHER PUBLICATIONS

"The International Search Report and Written Opinion of the International Searching Authority", in connection with PCT/US2018/016162, filed Jan. 31, 2018, dated May 3, 2018.

*Primary Examiner* — Alicia Torres
(74) *Attorney, Agent, or Firm* — McKee, Voorhees & Sease, PLC

(57) ABSTRACT

A sensor assembly includes a sensor in the form of a microwave radar device to dispense microwaves in an area where seed or other particulate material is to be sensed. This may be a seed tube of a row unit. The microwaves of the radar provide an accurate determination if a seed or other particulate material has passed through the field of vision of the sensor to provide an accurate sensing of a seed event. This information can be used to determine the rate of planting, skips, doubles, as well as any other information related to the passing of a seed or other particulate material.

12 Claims, 21 Drawing Sheets

(56) References Cited

U.S. PATENT DOCUMENTS

| | | |
|---|---|---|
| 6,346,888 B1 | 2/2002 | Conrad et al. |
| 8,631,749 B2 | 1/2014 | Sauder et al. |
| 2012/0279314 A1* | 11/2012 | Hien ................. A01C 7/105 73/861 |
| 2018/0014456 A1* | 1/2018 | Conrad .................. A01C 7/04 |

* cited by examiner

RADAR BASED SEED SENSOR FOR USE WITH AGRICULTURAL SYSTEMS, METHODS, AND APPARATUS

CROSS-REFERENCE TO RELATED APPLICATIONS

This claims priority under 35 U.S.C. § 119 to provisional application Ser. No. 62/452,703, filed Jan. 31, 2017, which is herein incorporated by reference in its entirety and for all purposes.

FIELD OF THE INVENTION

The invention relates generally to agricultural implements. More specifically, but not exclusively, the invention relates to a radar-based sensor for use with various aspects of implements, such as for use as a seed sensor with an agricultural planting implement. The sensor can be used with generally any aspect of agriculture.

BACKGROUND OF THE INVENTION

An agricultural row crop planter is a machine built for precisely distributing seed into the ground. The row crop planter generally includes a horizontal toolbar fixed to a hitch assembly for towing behind a tractor. Row units are mounted to the toolbar. In different configurations, seed may be stored at individual hoppers on each row unit, or it may be maintained in a central hopper and delivered to the row units on an as needed basis. The row units include ground-working tools for opening and closing a seed furrow, and a seed metering system for distributing seed to the seed furrow.

Seed metering systems and/or devices utilize seed sensors as part of a diagnostic tool to assure a farmer, as the planter is moving across a field, it is delivering seed into the furrow. A seed sensor on each row of the planter senses when a seed is passed from the planter into the ground and, when used with other electronic components and a monitor, will present information to the farmer that the planter is planting effectively and not malfunctioning. The monitor performs real-time logging, mapping/recording, planter/application control, yield monitoring, determining seeding rates and population, fertilizer application, and harvest mapping, thus insuring seed spacing accuracy in the field.

Seed sensing can utilize a mechanical lever or similar construct to indicate a seed is moving through the seed tube. Seed sensor technologies today may utilize a variety of optical methods wherein a passing seed momentarily blocks light transmitted across a seed tube from a receiver on the opposite side. Likewise, electromagnetic sensors are also used for seed sensing. These sensors use electromagnetic waves in the sonic range. A sensor transmits ultrasonic waves across the seed tube and receives the reflected wave from the seed passing down the seed tube.

Mechanical systems are obviously prone to mechanical failure. Optical systems can be affected by stray and reflected light. Sonic and ultrasonic waves can be affected by temperature, humidity, and air pressure. Therefore, there is a need in the art for an improved seed sensing device and method which is not affected by temperature, air pressure, humidity, light, or mechanical malfunctions. There is also a need in the art to identify non-seed particulates within the seed tube.

Additional agricultural implements utilize sensors to acquire data associated with various agricultural processes. The sensors can be used to determine data/information associated with soil in a field, material (granules, particulates, liquids, etc.) stored in a compartment, distance between objects, and/or statuses of or information related to an agricultural process. Therefore, there is also a need in the art for flexible sensors that can be used in a plethora and varied number of agricultural processes.

BRIEF SUMMARY OF THE INVENTION

Therefore, it is a primary object, feature, and/or advantage of the invention to improve on and/or overcome the deficiencies in the art.

It is another object, feature, and/or advantage of the invention to provide a seed sensor, which comprises a seed tube. A microwave radar device affixed to said seed tube generates and receives electromagnetic waves. Signal processing components electronically process the transmitted and received wave lengths and generate electronic signals which represent the movement of the seed.

It is yet another object, feature, and/or advantage of the invention wherein the electromagnetic waves are 10 GHz-300 GHz.

It is a further object, feature, and/or advantage of the invention, wherein the electrical signals generated by the returning microwaves are then manipulated with additional electronic components to filter noise and outside echoes from the signal.

It is still a further object, feature, and/or advantage of the invention to manipulate the electrical utilizing additional electronic components to highlight or exaggerate the effect of the passing of the seed in the seed tube.

It is still yet a further object, feature, and/or advantage of the invention to further analyze the electrical signal by digital signal algorithms running on a microprocessor to determine that a seed or seeds are passing by the sensor.

It is still yet a further object, feature, and/or advantage of the invention wherein the electrical signal is sent to the planter via an open collector signal.

It is still yet a further object, feature, and/or advantage of the invention wherein the electrical signal utilizes the LIN (Local Interconnect Network) communication protocol.

It is still yet a further object, feature, and/or advantage of the invention wherein the electrical signal utilizes a serial communication protocol.

It is still yet a further object, feature, and/or advantage of the invention wherein the electrical signal utilizes the CAN bus (Controller Area Network) communication protocol.

It is still yet a further object, feature, and/or advantage of the invention wherein the electrical signal utilizes the Ethernet communication protocol.

It is still yet a further object, feature, and/or advantage of the invention wherein multiple radars may be used using the same or different radar processing techniques to assist in accurately identifying seed passage or different physical characteristics about the seed.

It is still yet a further object, feature, and/or advantage of the invention wherein the seed tube may be fabricated from or coated with conductive material that reflects the microwave signals from passing beyond the seed tube.

It is still yet a further object, feature, and/or advantage of the invention wherein the seed tube may be fabricated from or coated with material that absorbs the microwave signals, so they do not pass beyond or reflect from the seed tube walls.

It is still yet a further object, feature, and/or advantage of the invention wherein a method of detecting a seed utilizes a radar frequency generated and received within a seed tube.

It is another object, feature, and/or advantage of the invention to provide a row planter with a row cleaner monitor. A microwave radar device affixed to said row planter that generates and receives electromagnetic waves. Wherein signal processing components electronically process the transmitted and received wave lengths and generate electronic signals which represent the row cleaner operation.

It is another object, feature, and/or advantage of the invention to provide a row planter with a row unit up or down position indicator. A microwave radar device affixed to said row planter that generates and receives electromagnetic waves. Wherein signal processing components electronically process the transmitted and received wave lengths and generate electronic signals which represent the row unit up or down position.

It is another object, feature, and/or advantage of the invention to provide a row planter with a product level, i.e., seed, fertilizer, or insecticide, indicator within bulk fill or row unit hoppers. A microwave radar device affixed to said row planter generates and receives electromagnetic waves. Signal processing components electronically process the transmitted and received wave lengths and generate electronic signals which represent product levels.

It is another object, feature, and/or advantage of the invention to provide a seed meter that detects seeds on a seed disk. A microwave radar device affixed to said seed meter generates and receives electromagnetic waves. Signal processing components electronically process the transmitted and received wave lengths and generate electronic signals which indicates a seed is present on a seed disk.

It is another object, feature, and/or advantage of the invention to provide a row planter with a seed detector for bulk fill tubes. A microwave radar device affixed to said row planter generates and receives electromagnetic waves. Signal processing components electronically process the transmitted and received wave lengths and generate electronic signals which detects seeds within bulk fill tubes.

It is another object, feature, and/or advantage of the invention to provide a row planter with an animate or inanimate object detector for wing deployment. A microwave radar device affixed to said row planter generates and receives electromagnetic waves. Signal processing components electronically process the transmitted and received wave lengths and generate electronic signals which represents the presence of animate or inanimate objects, i.e., living beings or natural structures.

It is another object, feature, and/or advantage of the invention to provide a row unit which monitors if a trench is closed. A microwave radar device affixed to said row planter generates and receives electromagnetic waves. Signal processing components electronically process the transmitted and received wave lengths and generate electronic signals which represents a closed trench.

It is another object, feature, and/or advantage of the invention to provide a row unit which monitors trench depth. A microwave radar device affixed to said row planter generates and receives electromagnetic waves. Signal processing components electronically process the transmitted and received wave lengths and generate electronic signals which represents trench depth.

These and/or other objects, features, and advantages of the invention will be apparent to those skilled in the art. The invention is not to be limited to or by these objects, features and advantages. No single embodiment need provide each and every object, feature, or advantage.

The disclosed method for seed sensing also uses electromagnetic waves, but the sensor radiates and receives microwaves with a much higher frequency. Microwave radar is better suited to identify seed in a medium of air as there is less noise in the signal. Microwave radar signals are not affected by temperature and pressure; wherein ultrasonic waves are. Radar microwave signal analysis, like ultrasonic, can also distinguish between seed and field dust and is not affected by stray sources of light. Properties of the reflected microwave signal, such as energy, time delay, and frequency shift capture information about the object's characteristics and dynamics such as size, shape, orientation, material, distance, and velocity. Analysis of these properties can be used to determine that not only a seed has passed, but physical characteristic about the seed. Because there is less noise and more fidelity in the microwave system, microwave radar provides a better seed sensing capability than ultrasonic based electromagnetic sensors.

The sensor could be used for fertilizer and insecticide detection. Other uses for radar on a planter include, detecting clogs or excess waste in the trash collector, the position of a row unit (up or down), the level of products (seed, fertilizer, insecticide) in bulk fill or row hoppers, the detection of seeds on seed disc (not just in the tube), the detection of seeds in bulk fill tubes, presence detection for marker deployment, i.e., don't deploy markers if a person or object is present, to detect unclosed trenches behind the row unit, and measuring seed trench depth.

Figure 1:
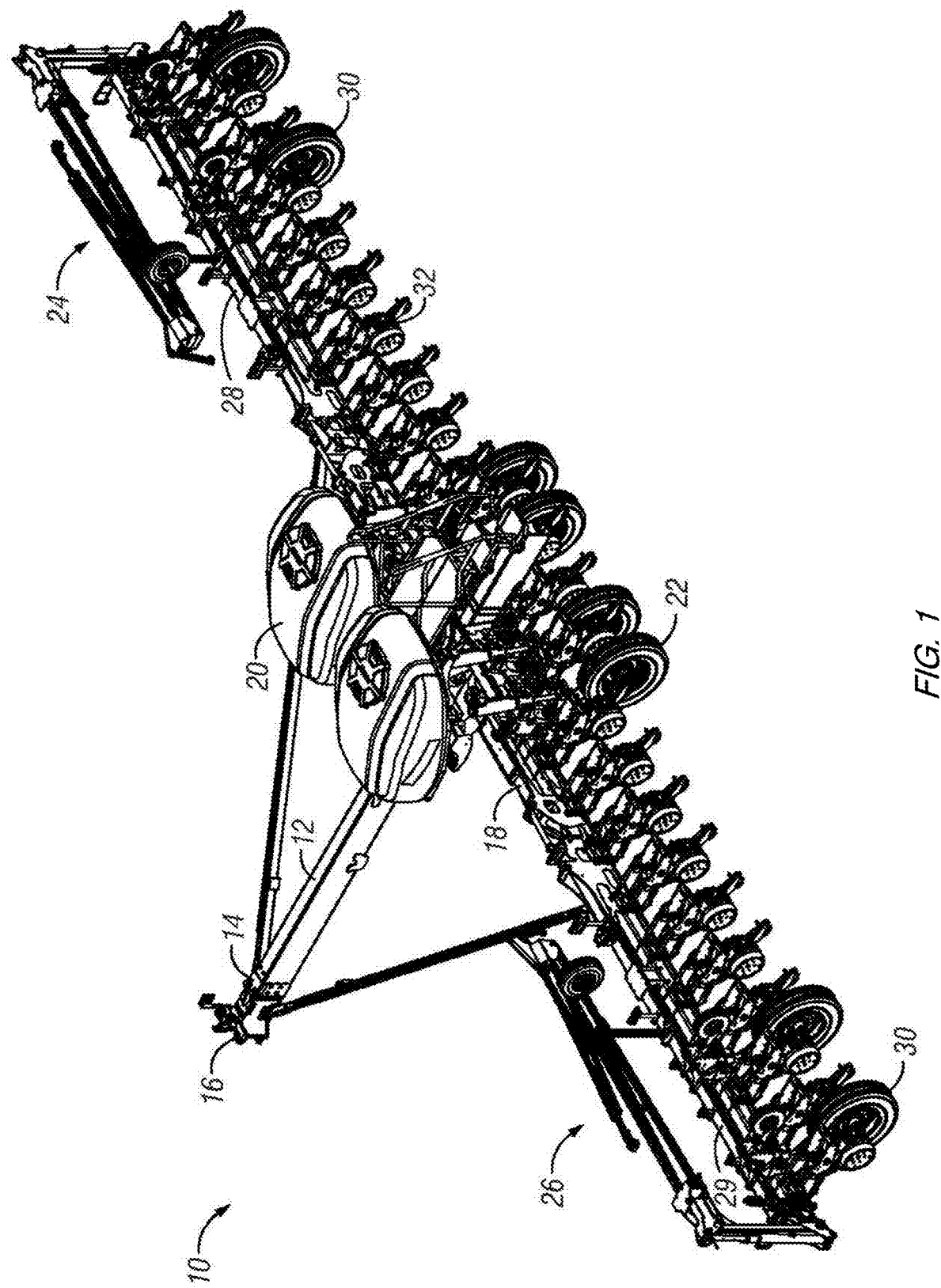
FIG. 1 is a perspective view of an agricultural planting implement.

Various embodiments of the invention will be described in detail with reference to the drawings, wherein like reference numerals represent like parts throughout the several views. Reference to various embodiments does not limit the scope of the invention. Figures represented herein are not limitations to the various embodiments according to the invention and are presented for exemplary illustration of the invention.

DETAILED DESCRIPTION

FIG. 1 shows an agricultural implement 10, in this case, a row planter. The planter 10 is usually attached to and pulled by a tractor. However, it should be appreciated that other equipment and/or vehicles may move the implement 10. For purposes of the present disclosure, the implement 10 will be referred to as a planter. The planter 10 includes a tongue 12 having a first end 14 and an opposite second end. The tongue 12 includes a hitch 16 at the first end 14, with the hitch 16 being connected to the tractor. At the opposite end of the tongue 12 is a central tool bar 18.

As shown in FIG. 1, central hoppers 20 are positioned at the central toolbar 18. The hoppers 20 are configured to store seed, fertilizer, insecticide, or other types of material (particulates, granules, liquids, etc.) for use in farming. The hoppers 20 may both contain the same material or could contain separate materials. The use of the central hoppers 20 allows for a large amount of material to be added and stored at a centralized location. Also connected to the central toolbar is a plurality of central wheels, which may be known as transport wheels 22, extending generally downwardly from the central toolbar 18. The wheels 22 contact the ground and support the central hoppers 20. The wheels stabilize the implement 10 and are the wheels that contact the ground when in a working position or a transport position, e.g., if the implement 10 is a front folding implement such that the wings 24, 26 are folded forward with wing wheels 30 not contacting the ground.

Extending generally from both sides of the toolbar 18 are first and second wings 24, 26. The wings 24, 26 are generally identical and mirror images of one another. Therefore, only one wing will be described with the understanding that the other wing will be generally the same configuration. The first wing 24 includes a bar 28. Mounted to the bar 28 are a plurality of ground-engaging row units 32, as well as a plurality of wheels 30. The wheels 30 are configured to contact the ground. The row units 32 may be seeders, fertilizers, insecticide sprayers, or other dispensers, discs, plows, or other ground-engaging units. The wings 24, 26 may also include at least one fold cylinder and a down force cylinder.

Figure 2:
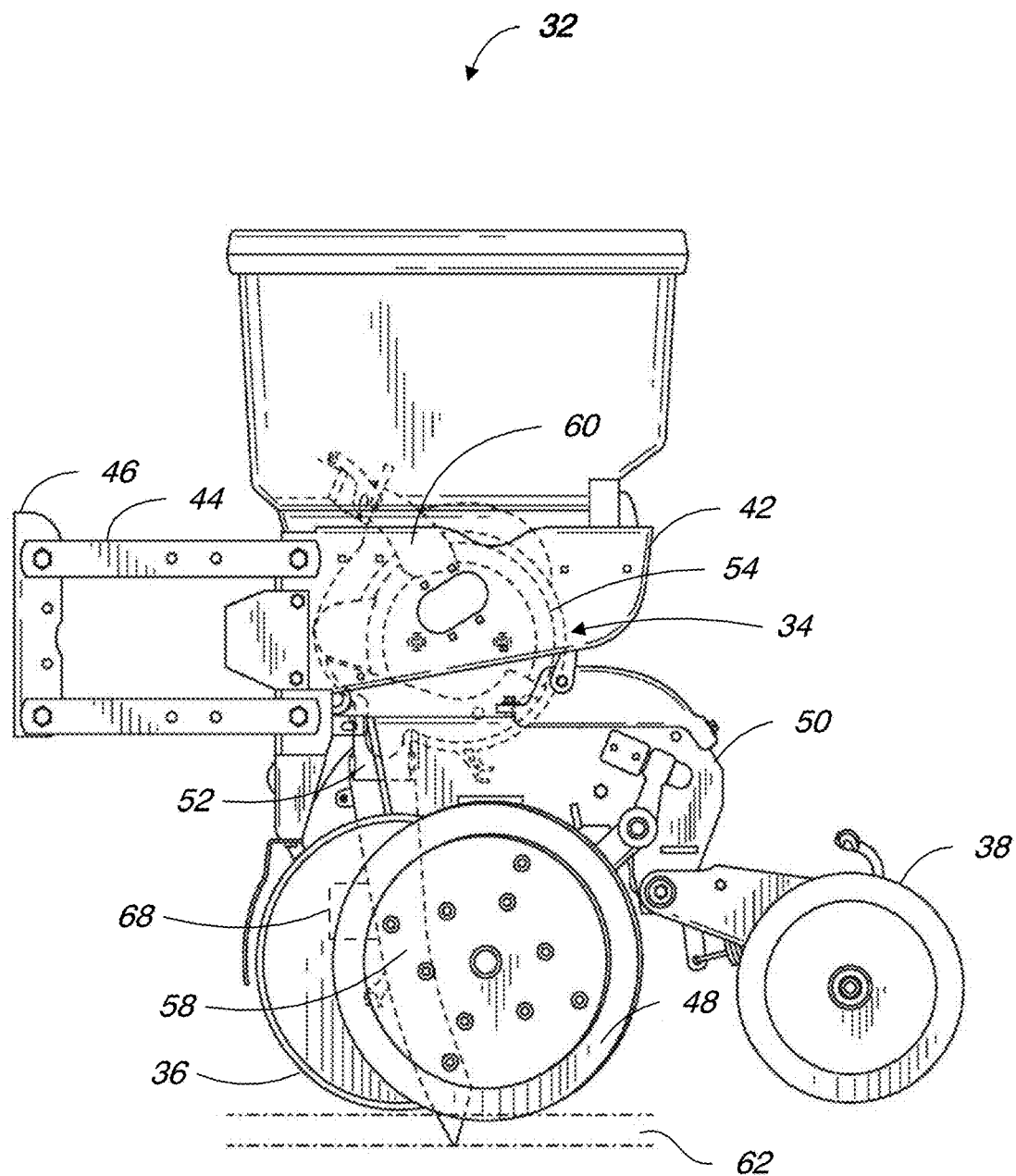
FIG. 2 is a side elevation view of a row unit for use with a planting implement.

FIG. 2 is a side elevation view of a typical row unit 32 for planting a seed in the field, which includes a seed meter 34, a furrow opener 36, and furrow closer 38, two gauge wheels 48 collectively, and a depth control mechanism 50. The gauge wheels 48 and depth control mechanism 50 work together to control the depth of the furrow or trench created by the opener 36. The seed meter 34 includes a seed disk 54, a seed singulator 60, a seed sensor assembly 68, a seed chute 52, and a seed tube 58. The seed meter can be generally any air or mechanical meter capable of singulating seed and delivering seed from the meter 34 via a seed chute 52 extending therefrom. One example of a seed meter is disclosed in U.S. application Ser. No. 13/829,726, which is hereby incorporated by reference in its entirety. However, it should be appreciated that generally any type of seed meter could be utilized. For example, it is also contemplated that multiple seed meters be included at the row unit, such as is included in U.S. application Ser. No. 14/478,222, which is hereby incorporated by reference in its entirety.

The seed meters are configured to dispense seed at predetermined rates so as to distribute the seed or other material accordingly. This could be to provide a desired spacing between subsequent seeds, to plant a desired population of seed, or to provide another controlled and variable distribution of the material such that it will be desired to "know" and quantify the amount of material being distributed via the meter.

Figure 3A:
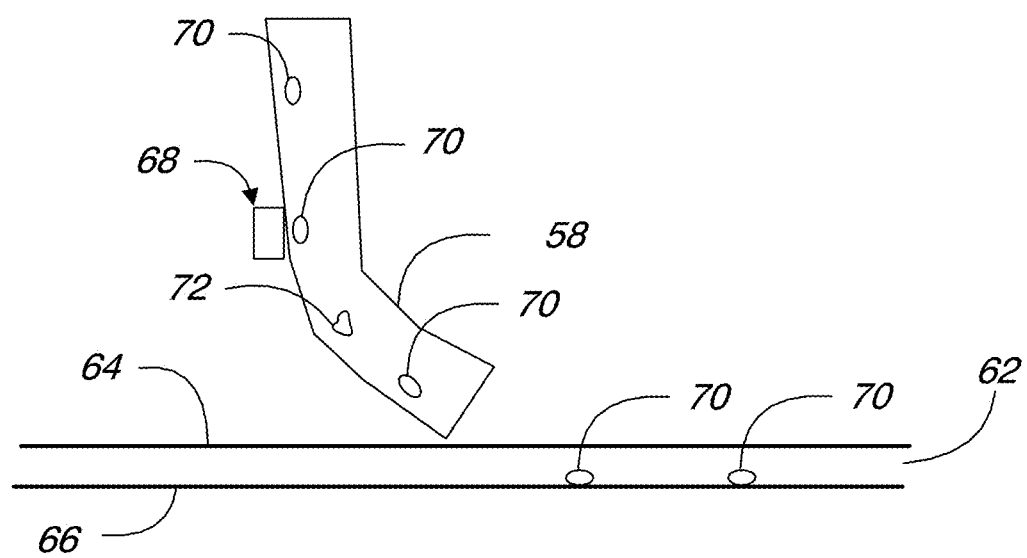
FIG. 3A is seed tube with a seed sensor for use with a row unit.
Figure 3B:
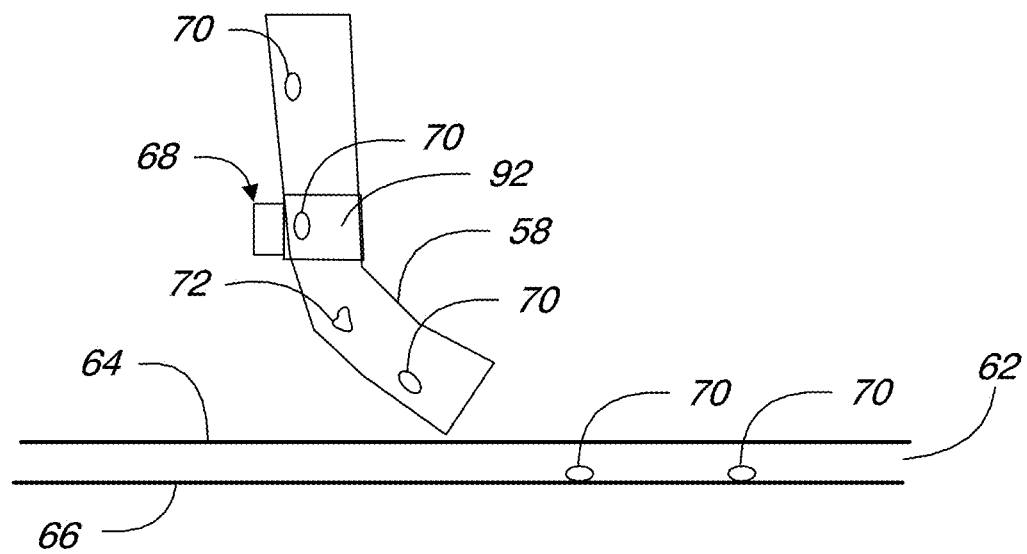
FIG. 3B is seed tube with a seed sensor for use with a row unit.

Therefore, an aspect of the disclosure is directed towards a seed sensing device and method utilizing a Monolithic Microwave Integrated Circuit (MMIC), often pronounced "mimic". These devices typically perform functions such as microwave mixing, power amplification, low-noise amplification, and high-frequency switching. The use of the MMIC device or devices allows for, according to some aspects of the disclosure, the quantification of one or more materials. FIG. 3A shows a seed tube 58 with integrated seed sensor 68, wherein the seed sensor 68 is a MMIC based radar-on-a-chip device. Generally, seeds 70 travel down a seed tube 58 towards the furrow bottom 66 of the furrow 62. As particulate material, such as seeds 70, pass by the seed sensor 68, they are sensed and analyzed to indicate an actual seed 70 has passed. In order to more accurately quantify the materials being detected by the sensor 68, it may be helpful to "blind the radar" beyond the seed tube walls or limit the radar "eye site" to the tube to prevent seeing objects moving beyond the seed tube. There are at least two potential ways to blind the radar beyond the seed tube walls. One is to cover the seed tube or build it with a metal surface to reflect the radar wave back to the MMIC. The other is to absorb the radar waves with a radar absorbing material, RAM. FIG. 3B shows seed tube 58 utilizing a metal wrap 92, which is slotted to allow the radar transmitter and radar receiver to look through where the seed sensor 68 mates to seed tube 58. The seed tube shielding 92 may be copper, aluminum, or any conductive material. Shielding 92 may be wrapped or electroplated. The whole seed tube 58 may be covered or only a narrow band where the seed sensor 68 mates to seed tube 58. Seed tube 58 may be made entirely from any conductive material or combination thereof. Such a shielding provides the desired "blinding" of the radar.

Figure 4:
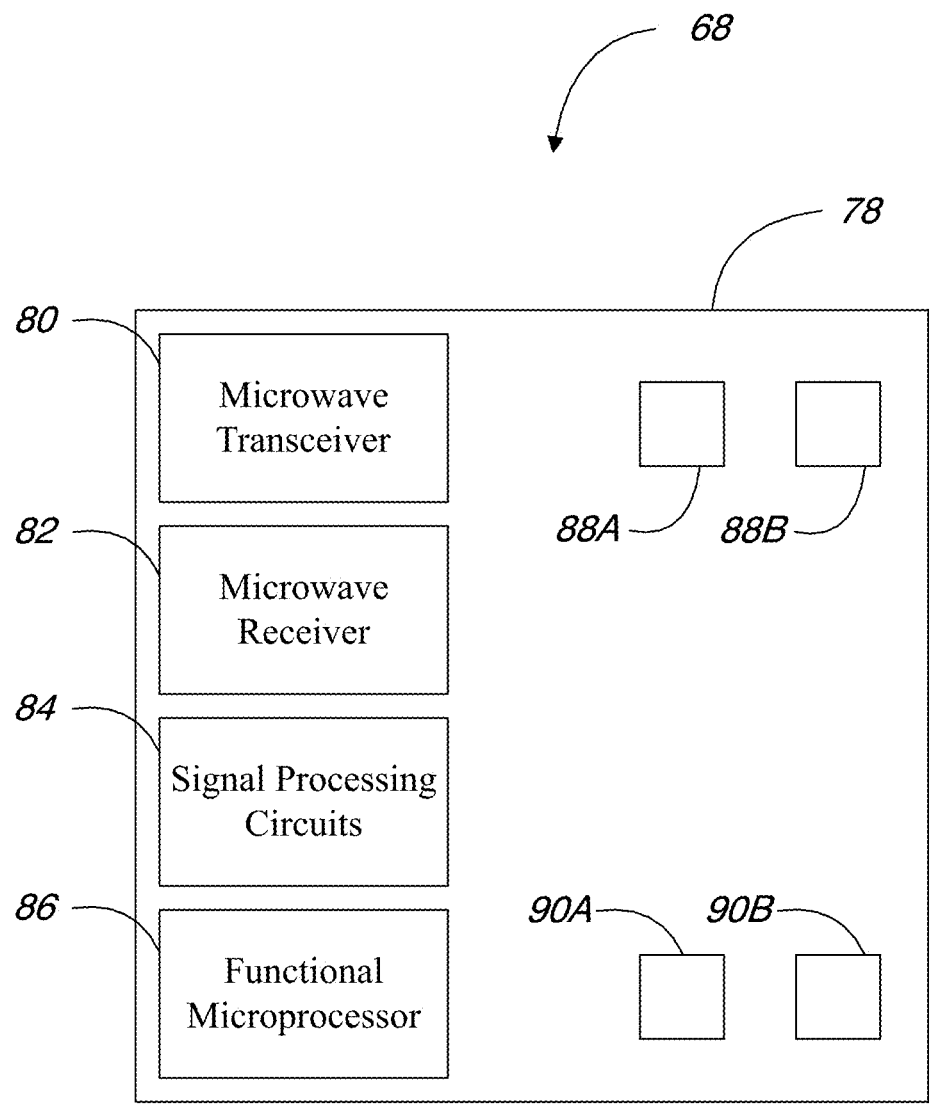
FIG. 4 is a seed sensor block diagram.

FIG. 4 is a block diagram of a radar-on-a-chip 68 system, which is integrated into a seed tube 58 for detecting and analyzing seeds 70. Recent advances in microwave radar technology have allowed radar systems to be produced on a microchip scale and at a relatively low cost. In addition to their small size and low cost, they have very low power requirements with increased resolution and algorithmic capabilities. With this advanced technology in such a small and cost-effective package, multiple radar systems can also be placed on a chip, with multiple antennas and processors, using different radar techniques, multiple radars can work together and focus on specific aspects of the radar target's characteristics in order to better sense it.

A Monolithic Microwave Integrated Circuit (MMIC) 68 integrates a microwave transceiver 80, a microwave receiver 82 signal processing circuits 84, a microprocessor 86, one or more transmitting antennas 88A-B, and one or more receiving antennas 90A-B, hence radar-on-a-chip. The microwave transceiver 80 generates electromagnetic waves within a frequency range from 10 GHz to 300 Ghz. The electromagnetic wave or radar signal is transmitted via one or more antennas 88 across a seed tube 58. The reflected electromagnetic wave is received via one or more antennas 90. The signal processing circuits 84 manipulate the electrical signals generated by the returning or reflected microwaves to filter noise and outside echoes from the signal. The signal processing circuits 84 further manipulate the electrical signal to highlight or exaggerate the effect of the passing of the seed 70 in the seed tube 58. The resulting electrical signal is analyzed by a computer program based digital signal algorithm running on one or more functional microprocessors 86 to determine if a seed 70 or seeds are passing by the sensor 68. Other particulate material such as field dust 72 are also identified and discounted, thus minimizing false seed counts.

The radar transmits and then receives waves as they reflect off the seed as it passes through the seed tube. The motion of the seed is determined from a change in frequency from the Doppler effect, and the resulting frequency differences are output as a change in voltage. For example, a higher voltage is output when a seed is approaching, and a lower output voltage when moving away. The resulting signal has been processed in two ways: on board by a microprocessor and computer algorithm, or an electronic circuit that alters the output signal, such as an inverter and an RC circuit in the same manner as the computer algorithm. The dust has less mass and does not reflect in the same way as a seed. It shows up as noise in the signal and is filtered out by the algorithm.

Once a seed event has been determined by the microwave seed sensor 68, the event is passed to the planter seed monitoring system, not shown. A seed event may be passed to the planter seed monitoring system via an open collector signal or other appropriate electronic signaling method. Properties of the reflected microwave signal, such as energy, time delay, and frequency shift capture information about the object's characteristics and dynamics such as size, shape, orientation, material, distance, and velocity. Analysis of these properties can be used to determine that not only a seed has passed, but physical characteristic about the seed. The information on individual seeding events could also be aggregated into summary and statistical data by the one or more functional microprocessor 86 in the seed sensor 68 and presented to the planting monitor via standard electronic communication protocols such as Ethernet, LIN (Local Interconnect Network), Serial, or CAN bus (Controller Area Network), or any similar protocols. Also, wireless communication protocols such as Bluetooth, Wi-Fi, WiMAX, Zig-Bee, Z-Wave may be utilized. Further, low-power wide-area network devices are contemplated. Wired and wireless protocols may be utilized in combination or separate.

Figure 5:
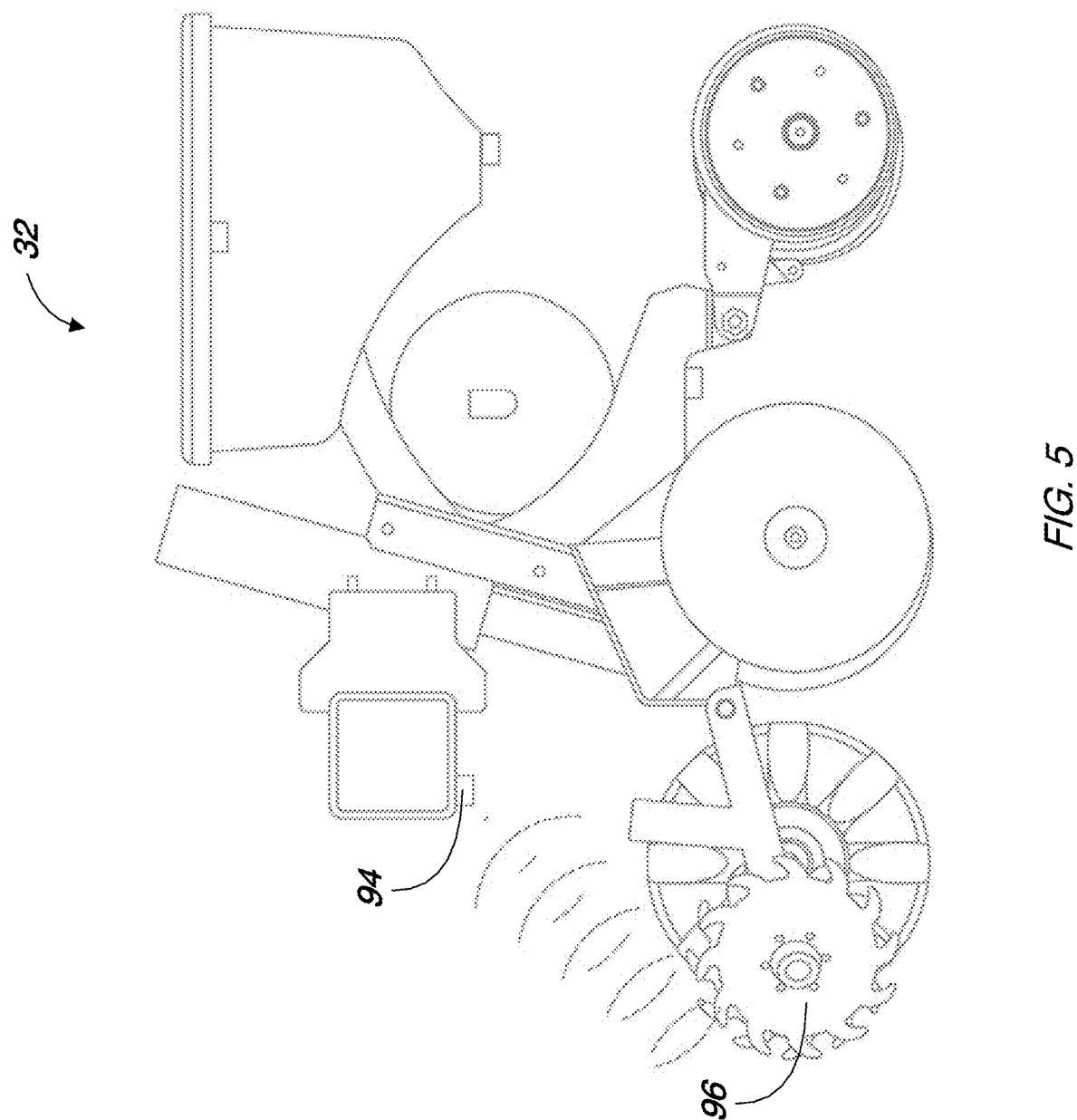
FIG. 5 is a row cleaner obstruction sensor according to aspects of the disclosure.

Further, microwave sensors can be utilized throughout a typical row planter. Residue in the seed trench can affect emergence. Row cleaners move residue through to ensure smooth row unit operation. Properly set row cleaners move about one-half to two-thirds of the time, just barely skimming across the ground. Row cleaners should not be used to move dirt or be set deep enough to cause valleys in the field. During heavy rains water will run down those valleys, which could potentially wash out the seed in the trench. Normally a farmer will look back while going across the field to make sure the wheels are not turning all the time. A radar sensor monitoring the row cleaners will alleviate the farmer of the need to constantly look back. As shown in FIG. 5, a row cleaner 96 is attached to a row unit 32 and monitored by row cleaner sensor 94, which may be mounted to the toolbar. The row cleaner sensor 94 can be a radar-based sensor, and can acquire information related to the cleaner, such as the amount of debris or material in contact with the cleaner 96 or in the vicinity of the same.

Figure 6:
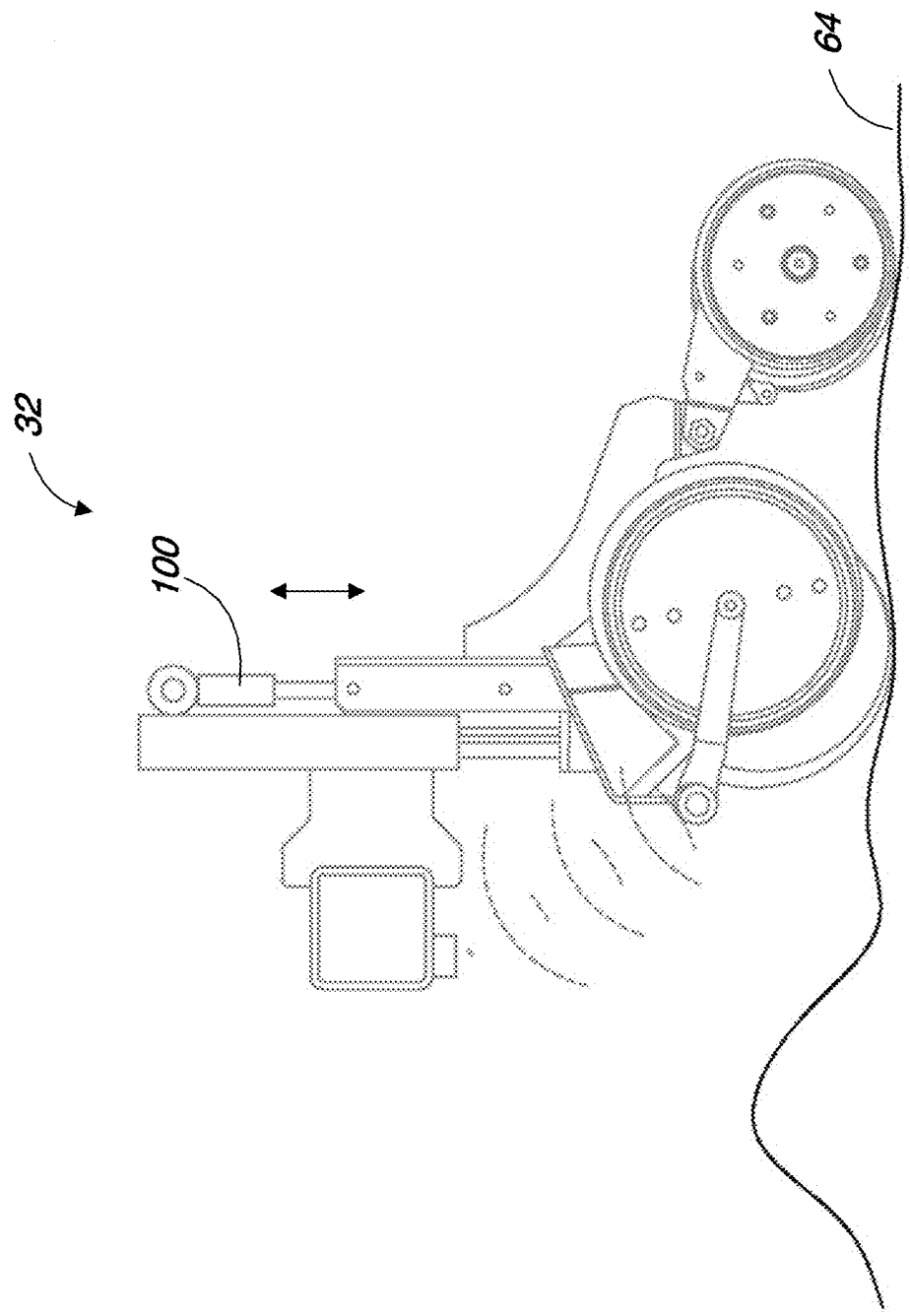
FIG. 6 is a row unit with position indication sensor according to aspects of the disclosure.

The up or down force of a row unit 32 may be monitored by radar sensor 98, as shown in FIG. 6. The sensor 98 is used to view ahead of the opening wheels and other components of the row unit. It can be positioned on a follower wheel of a fertilizer opener, a leader wheel ahead of a culture wheel or gauge wheel, or even positioned when no leader or other wheel is used with a row unit. The sensor can eliminate gauge wheels by determining a distance from the ground of each unit, i.e., the distance between the ground and the toolbar ahead of the opener wheel. The known distance can be included in any system, based upon speed of travel, to calculate the time between the sensed condition and the opening mechanism reaching said sensed condition location. When such a sensor is utilized, the map of the data base in the said sensor will determine its location and will utilize known or historical data related to the soil content or compaction of said soil to adjust the down force pressure of the row unit accordingly. The sensor provides a monitoring system for monitoring the ground in front of or adjacent the row unit to "read" the ground to prepare depth of the units ahead of time. Thus, the sensor may be capable of determining a change in a ground condition in front of or adjacent the row unit. The sensor provides a viewing area which is positioned to "view" a known distance between the viewing area and the opening wheel.

Figure 7A:
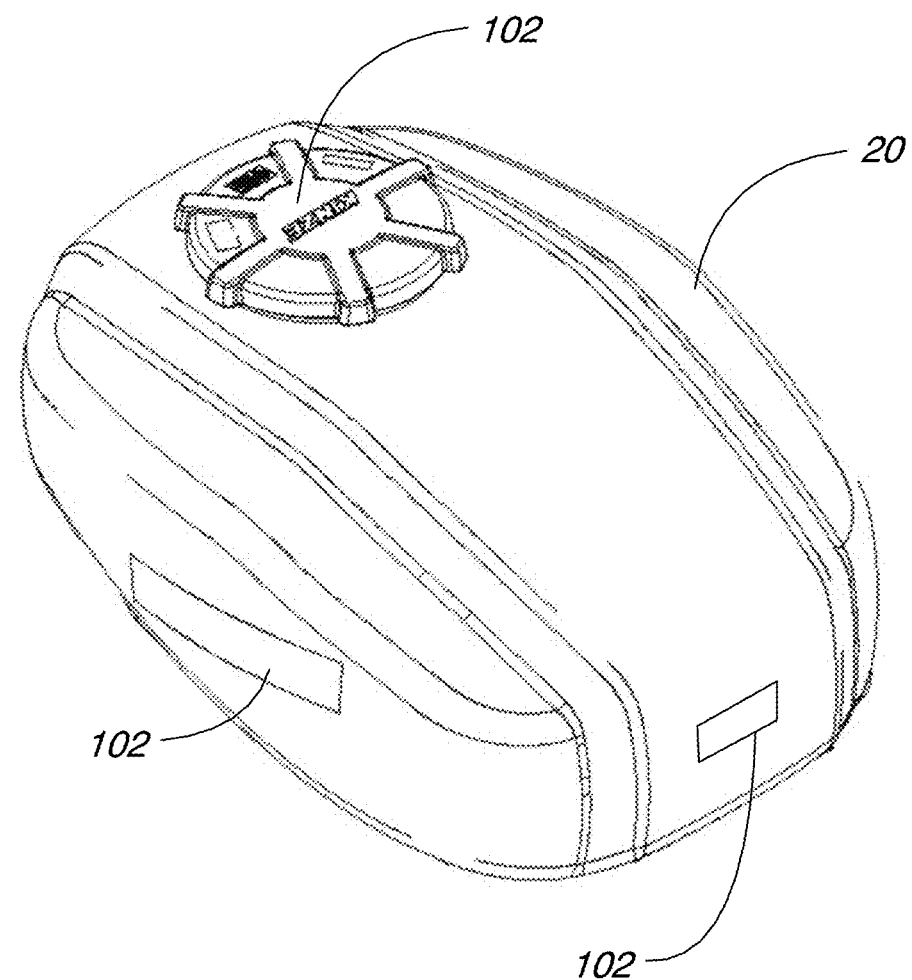
FIG. 7A is a bulk fill product level sensor according to aspects of the disclosure.
Figure 7B:
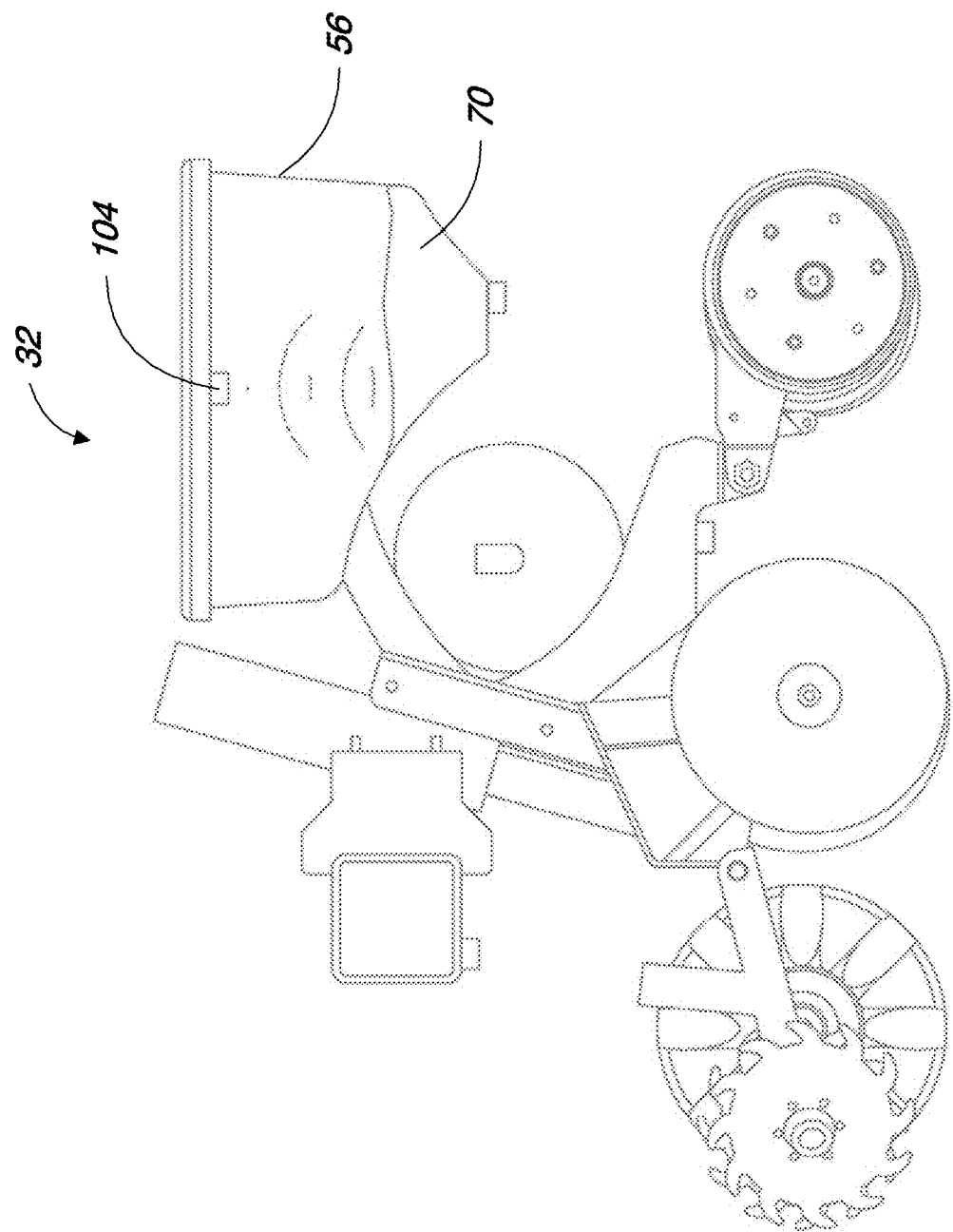
FIG. 7B is a row hopper product level sensor according to aspects of the disclosure.

Product levels such as seed, fertilizer, or insecticide can be monitored using a radar sensor as is disclosed herein. FIG. 7A illustrates a bulk fill central hopper 20 wherein a radar-based sensor 102 can placed on the top and/or sides to monitor product levels. Likewise, FIG. 7B illustrates a radar sensor 104 which monitors product 70 levels on the row unit 32 hopper 56. The data collected by said sensors 102 and 104 can then be communicated to the operator to quantify an amount of product in any of the containers.

Figure 8:
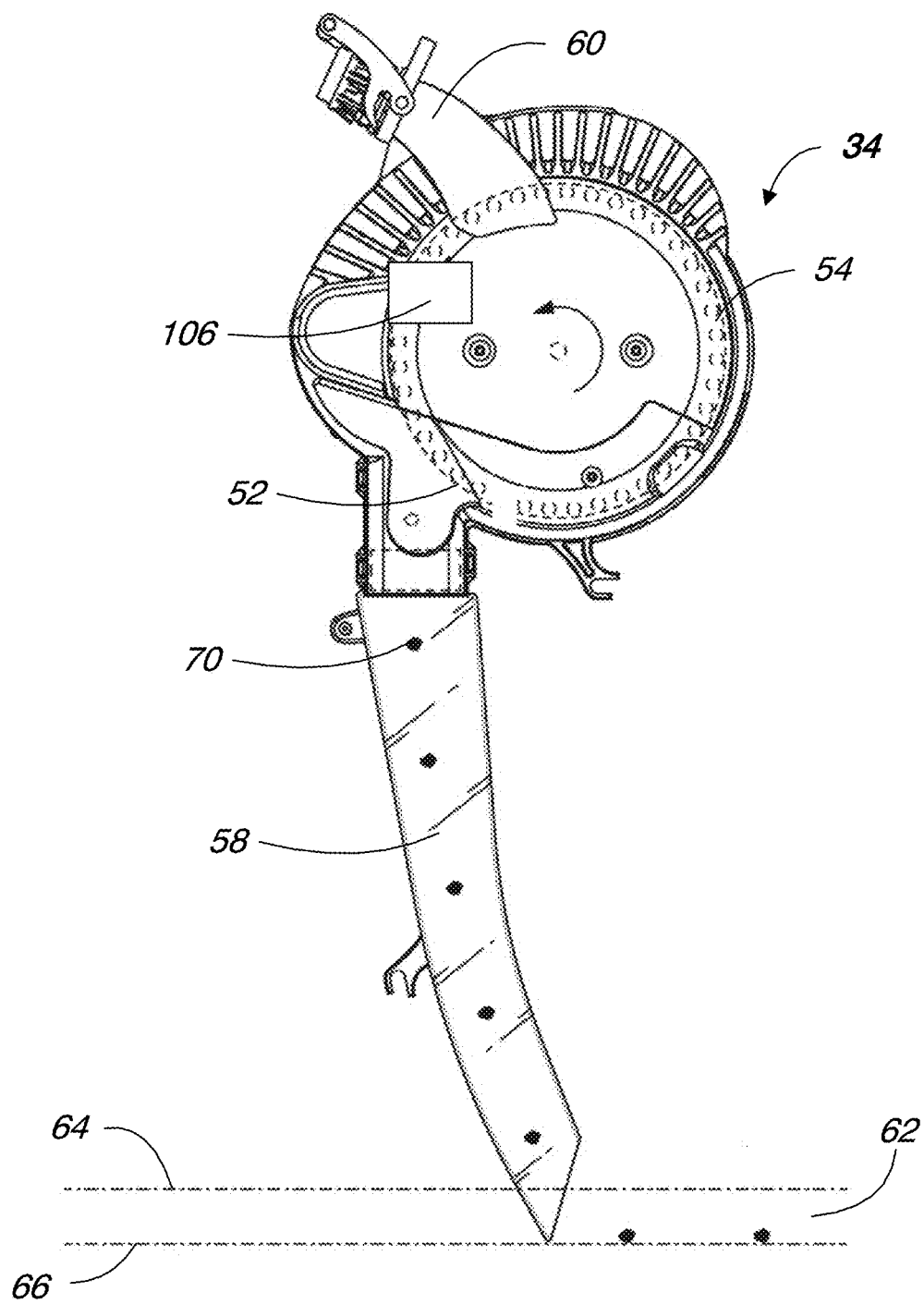
FIG. 8 is a seed disc seed sensor according to aspects of the disclosure.

Referring to FIG. 8, a portion of the row unit 32 is illustrated and includes the seed meter 34, which is comprised of a seed disc 54, a seed singulator 60, a seed sensor 106, and a seed chute 58. The seed meter 34 singulates seed 70 from a seed hopper 56 and drops the seed 70 in a controlled manner from the seed meter 34. Seed 70 is held to the seed disc 54 by a conventional vacuum source, positive pressure, mechanical means as is known in the art, or some combination thereof. The seed 70 then rotates to a point where the vacuum source is removed, thereby causing the seed 70 to leave the disc and enter the seed chute 58. The seed sensor 106 verifies that a single seed 70 is adhered to seed disc 54. The information from the sensor 106 may also be utilized in the control system to automatically adjust singulation, vacuum, and/or seed release point.

Figure 9:
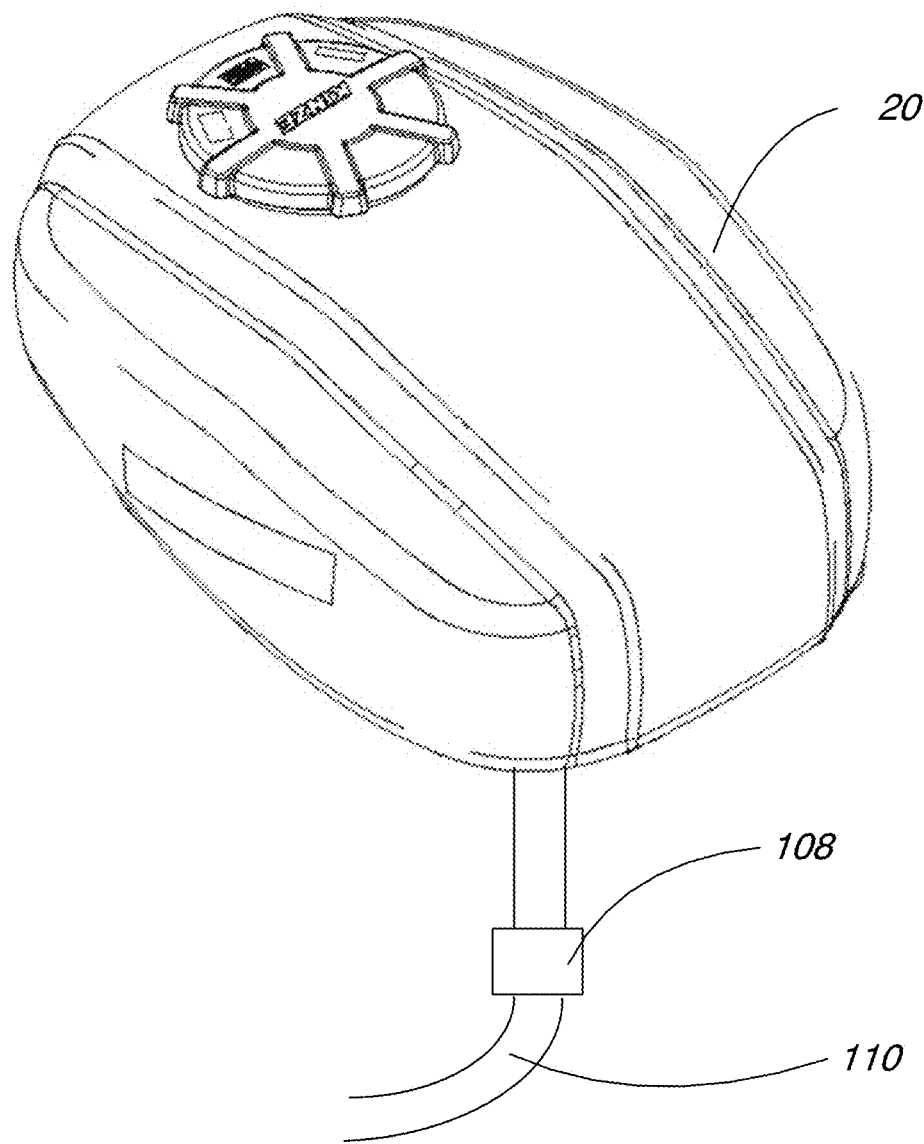
FIG. 9 is a fill tube seed sensor according to aspects of the disclosure.

Referring to FIG. 9, a central hopper 20 has bulk fill tube 110, which can also be known as an air seed delivery system. Such a system is disclosed in co-owned U.S. Pat. No. 8,448,585, which is hereby incorporated by reference in its entirety. Product 70 exits the hopper 20 through fill tube 110 or other conduit. The radar sensor 108 indicates the presence of product within the fill tube 110. The flow and volume of product may be measured. The data collected by said sensor 108 can then be communicated to the operator and may also be utilized in the control system to automatically adjust vacuum or another input to adjust the flow of product from the hopper to the row units of an implement. The present invention is not to be limited to the configuration shown in FIG. 9, and includes generally any possible configuration of product supply lines or tubes.

Figure 10:
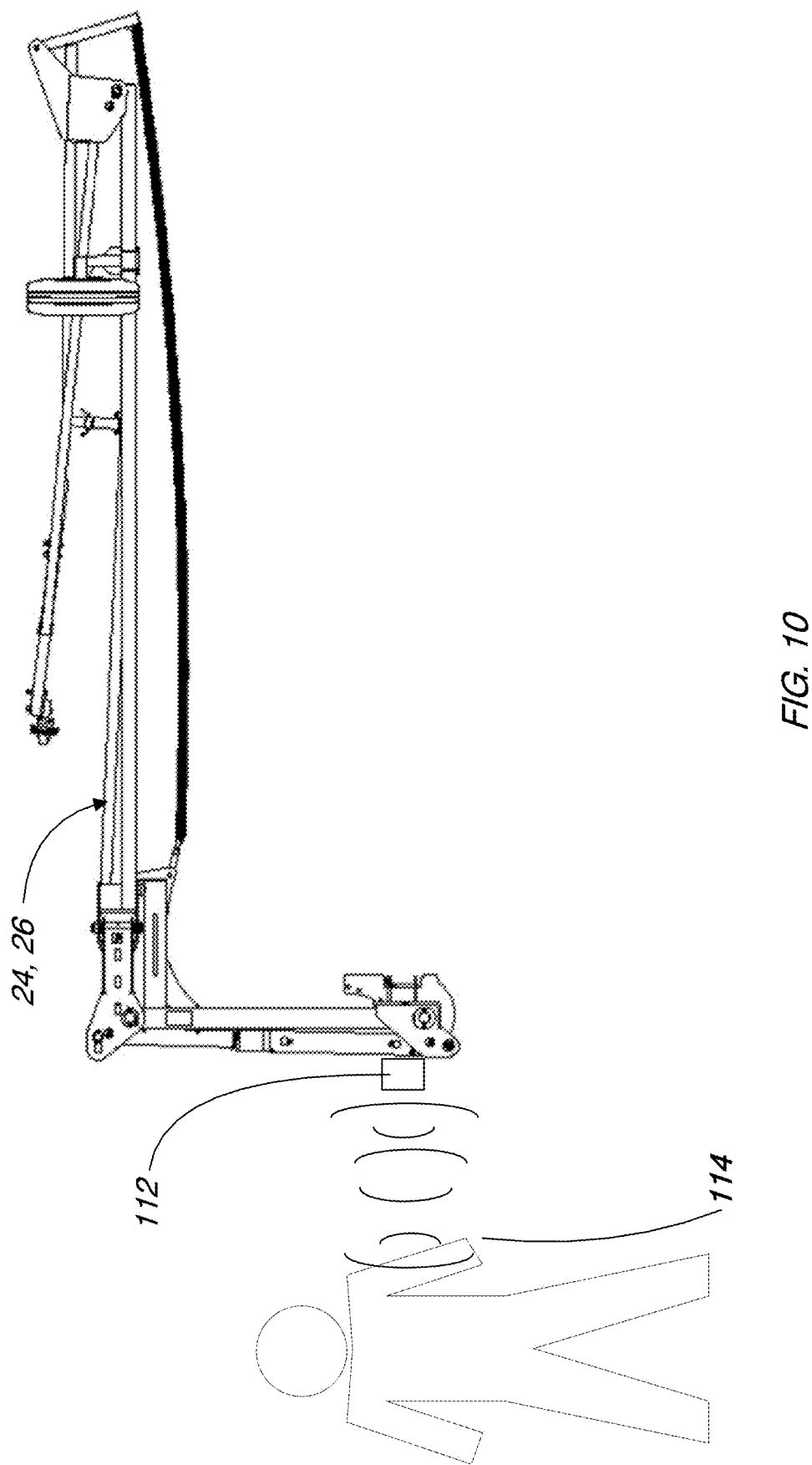
FIG. 10 is a marker deployment detection sensor according to aspects of the disclosure.

A presence detection sensor for marker deployment is also contemplated. FIG. 10 illustrates wing 24 or 26 (in this case in the form of a marker) in a folded, non-use position. A radar sensor 112 may be oriented anywhere along the wing to detect living beings or natural structures 114, such as people or a building. If the sensor 112 detects an object 114, the control system will prohibit wing 24 or 26 from deploying into a use position.

Figure 11:
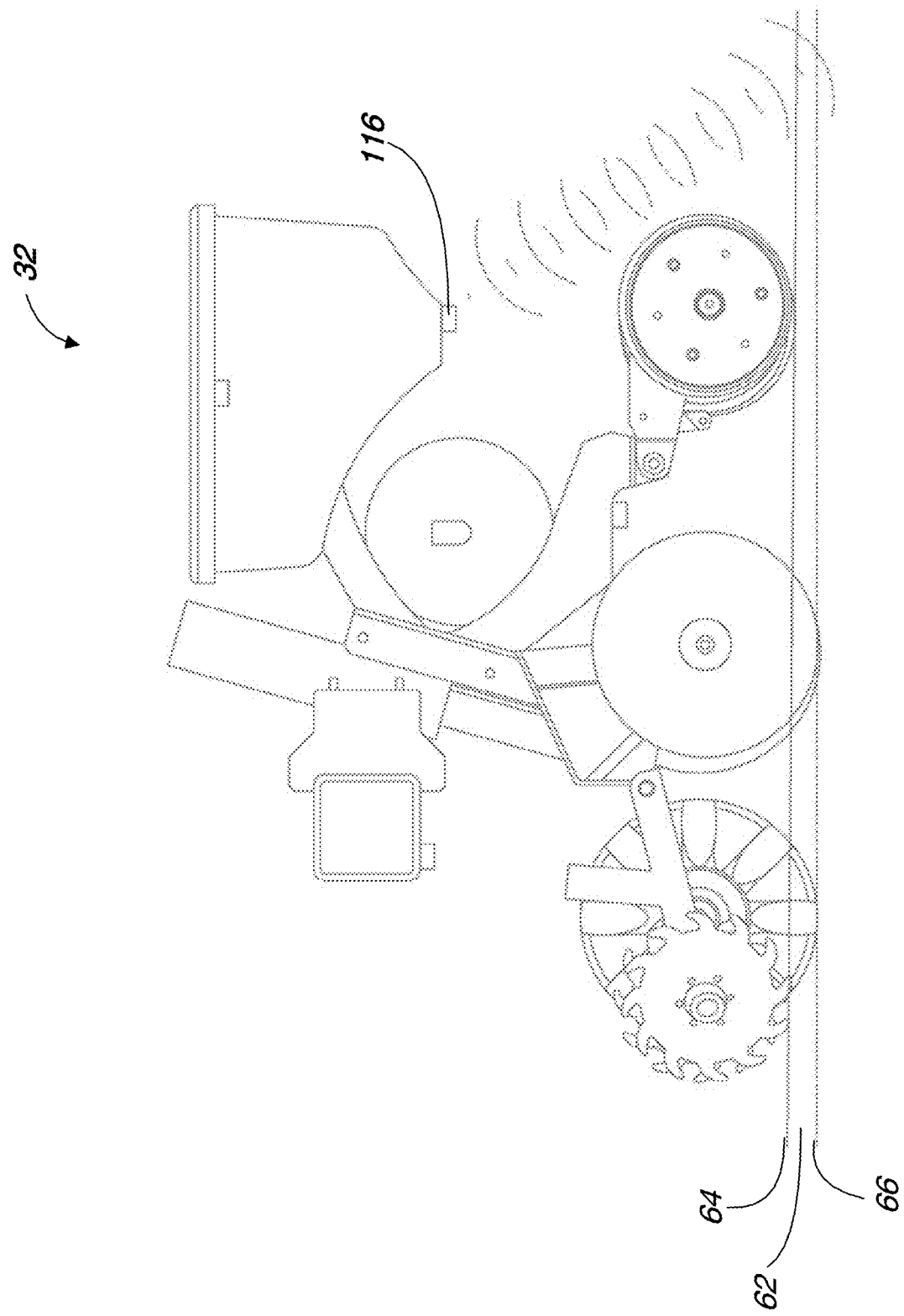
FIG. 11 is an unclosed trench sensor according to aspects of the disclosure.

A radar sensor can indicate if the trench has been closed. FIG. 11 is a side elevation view of another configuration of a row unit 32 utilizing a radar sensor 118 to monitor if the trench 62 is being closed. Such a sensor 116 may be positioned at the axle of the closing wheels, or directly behind the wheels, positioned ahead of or oriented behind, or in any other configuration in which the sensor is able to determine if the furrow or trench 62 has been closed by the closing wheels. The data collected by said sensor can then be communicated to the operator.

Figure 12:
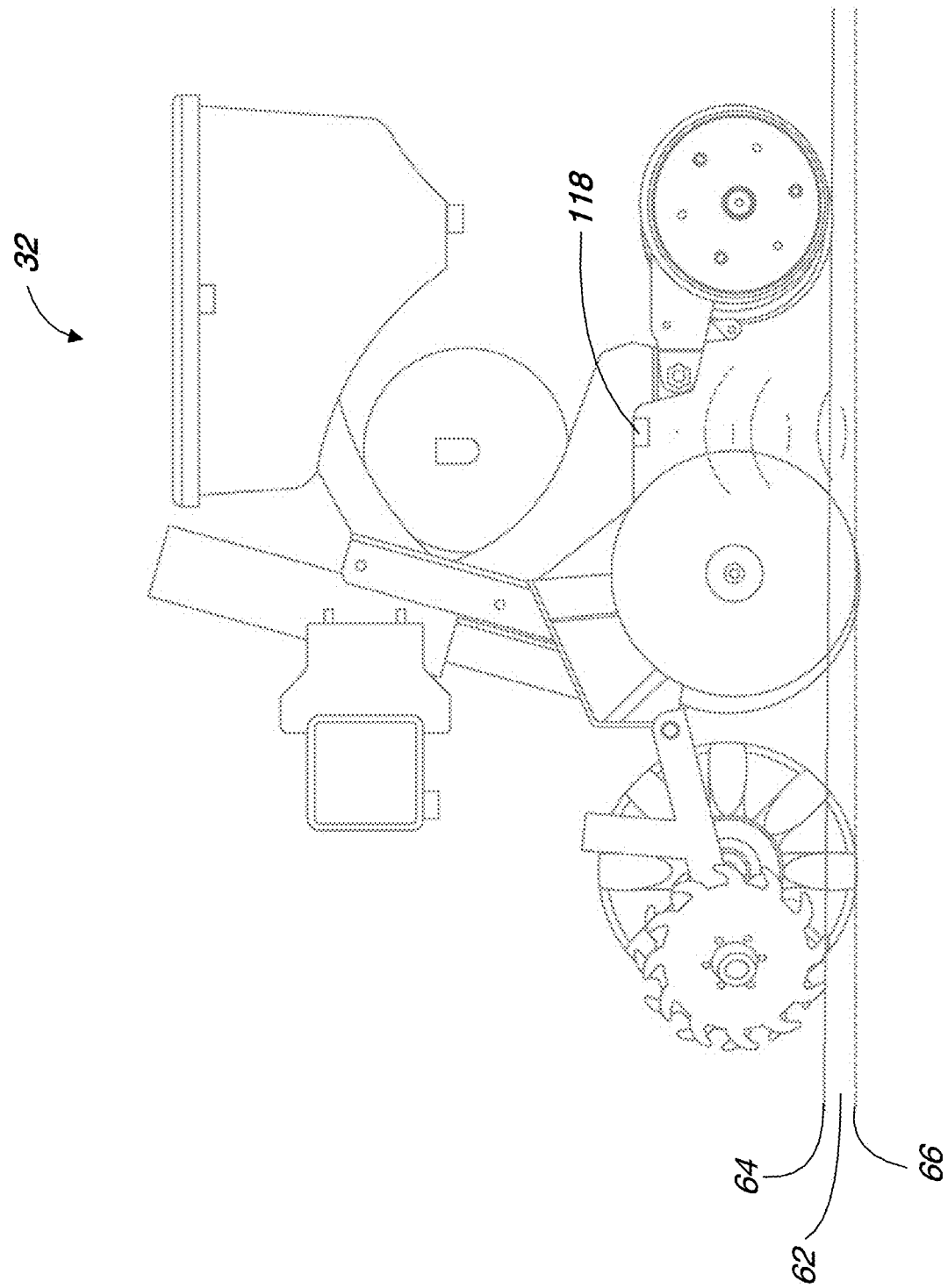
FIG. 12 is a trench depth sensor according to aspects of the disclosure.
Figure 13:
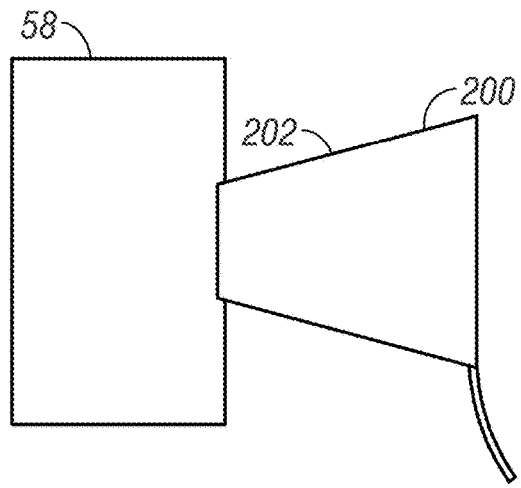
FIG. 13 is a side elevation view of a sensor assembly connected to a seed tube according to aspects of the disclosure.
Figure 14:
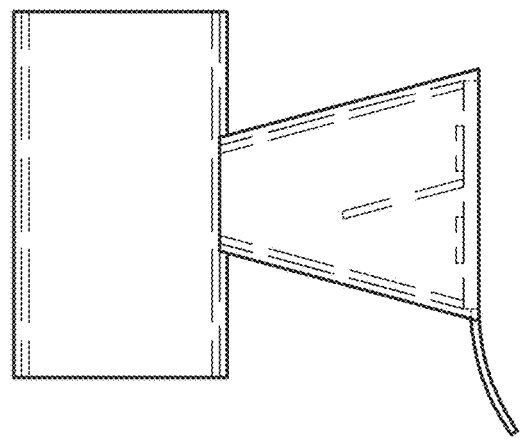
FIG. 14 is a view showing internal component of sensor assembly and seed tube.
Figure 15:
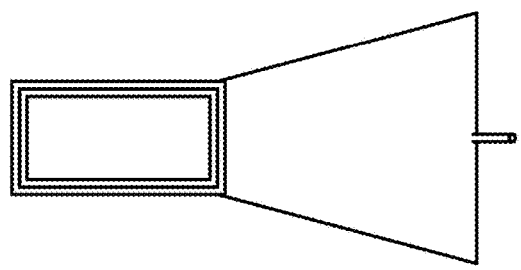
FIG. 15 is a top plan view of the sensor assembly and seed tube.
Figure 16:
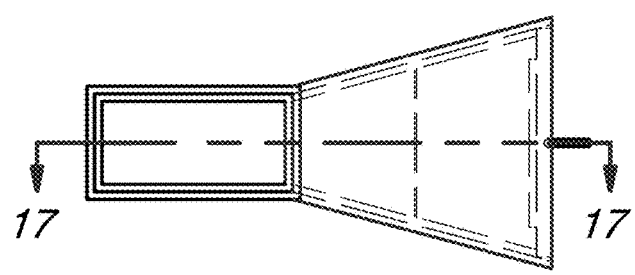
FIG. 16 is a top plan view showing various components of the sensor assembly and seed tube.
Figure 17:
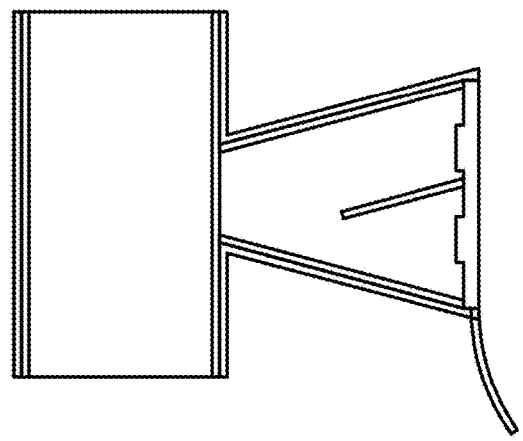
FIG. 17 is a sectional view of the sensor assembly and seed tube.

A radar sensor can measure seed trench depth. FIG. 12 is a side elevation view of another configuration of a row unit 32 utilizing a radar sensor 118 to aid in maintaining the depth of the opening wheel. Such a sensor 118 may be positioned at the axle of the opening wheels, or directly behind the wheels, positioned ahead of or oriented behind, or in any other configuration in which the sensor is able to determine a depth of furrow or trench 62 created by the opener wheels. The data collected by said sensor can then be communicated to the row unit positioning system in order to adjust down force pressure. In addition, when the soil characteristics change and a too deep trench 62 is created, the sensor 118 can communicate the row unit positioning system adjust the amount of down force pressure, thus maintaining proper trench 62 depth.

FIGS. 13-22 show an exemplary embodiment showing a seed sensor assembly 200 operatively connected to a seed delivery mechanism, in this case a seed tube 58, such as a seed tube utilizing gravity, in part, to direct seed to a furrow in the ground. The sensory assembly 200 includes sensor/chip 68 positioned in a housing 202, which may also be referred to as a tunnel. The sensor assembly 202 is used to determine that a seed has been delivered and can also be used to determine the spacing between subsequent seeds. The housing 202 may comprise a metallic material, such as aluminum or other conductive substrate to receive and dissipate waves. This may also be a lining on the outside of the housing, with the housing comprising a plastic material. The housing 202 and the seed tube 58 are shown to be lined with a liner material 204, 206. The liner material 204, 206 comprises a liner that is tuned to absorb waves of certain frequencies, such as radar waves. This eliminates or otherwise mitigates extraneous noise in the reading of the system, to make sure that it is the seed that is being sensed by the sensor 68 of the assembly 200.

The liner material 204, 206 can be an adhesive material that is applied to the seed tube and/or the housing, or it could be overmolded or otherwise plated, such as by injection molding. The liner material, as disclosed, is a radar absorbing material. For example, the material may comprise a carbon-based polymer that is tuned to absorb certain frequencies of radar waves. Such a product can be obtained from MAST Technologies, 6370 Nancy Ridge Drive, Suite 103, San Diego, Calif. 92121, or Laird Technologies, 16401 Swingley Ridge Road, Suite 700, Chesterfield, Mo. 63017. These are but a few examples of companies to acquire the radar absorbing material for use in the liner.

The sensor, as disclosed herein, can be a radar chip that includes a transceiver, receiver, and an antenna on an integrated board. A line can be connected to the sensor 68 to provide power thereto, and also to provide for a way to transmit the information of the sensor 68 to another location. The sensor 58 provides for a broad field of view (FOV). The liner material 204, 206 provides for a way to manage the broad FOV and to direct it to an area that is to sense the presence of a seed or other particulate material that is passing through the FOV. It should be noted that the orientation of the sensor is largely irrelevant, as the waves will emanate therefrom.

Figure 18:
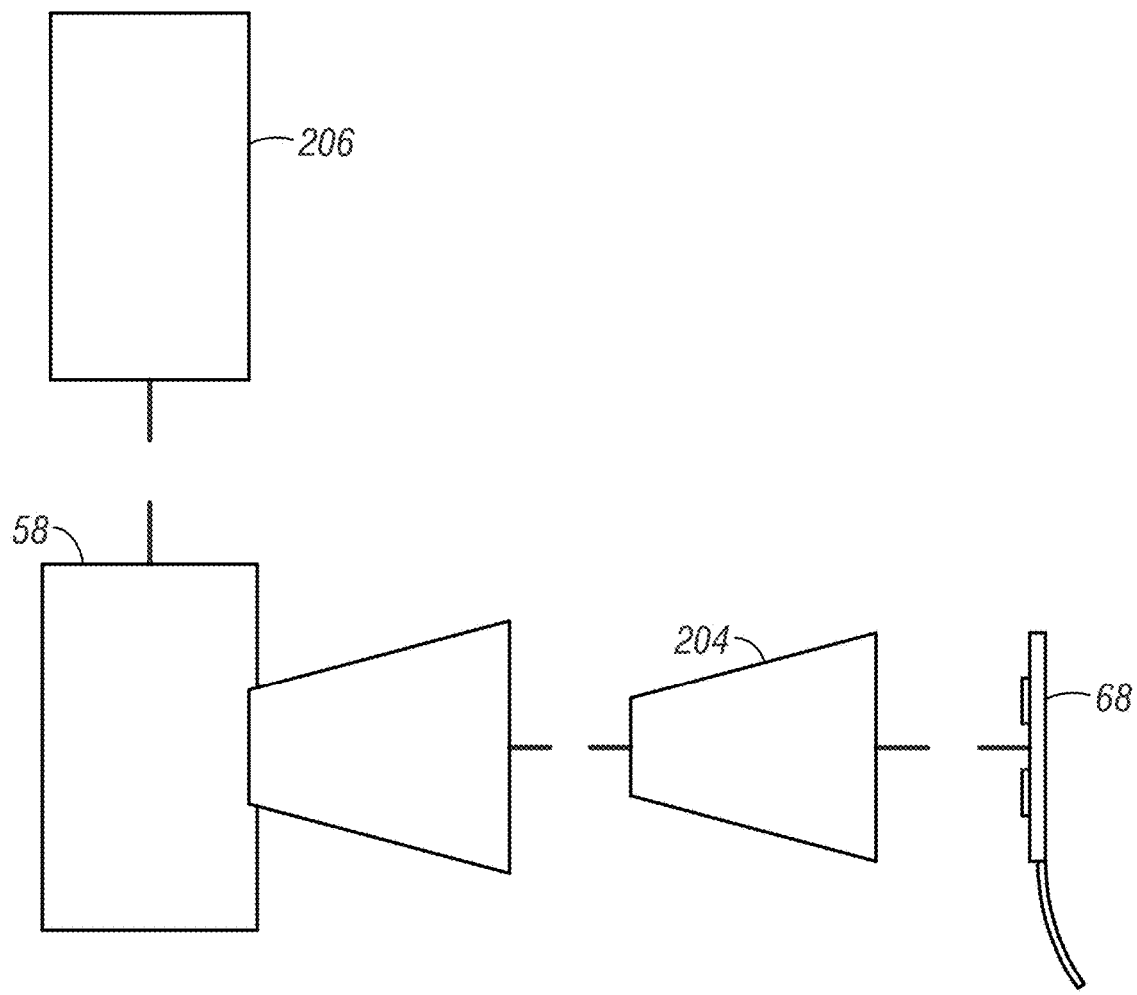
FIG. 18 is an exploded view of the sensor assembly and seed tube.
Figure 19:
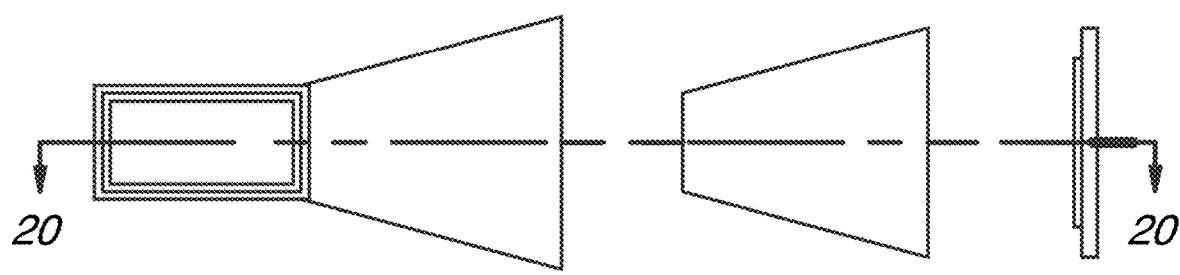
FIG. 19 is a top, exploded view of the sensor assembly and seed tube.
Figure 20:
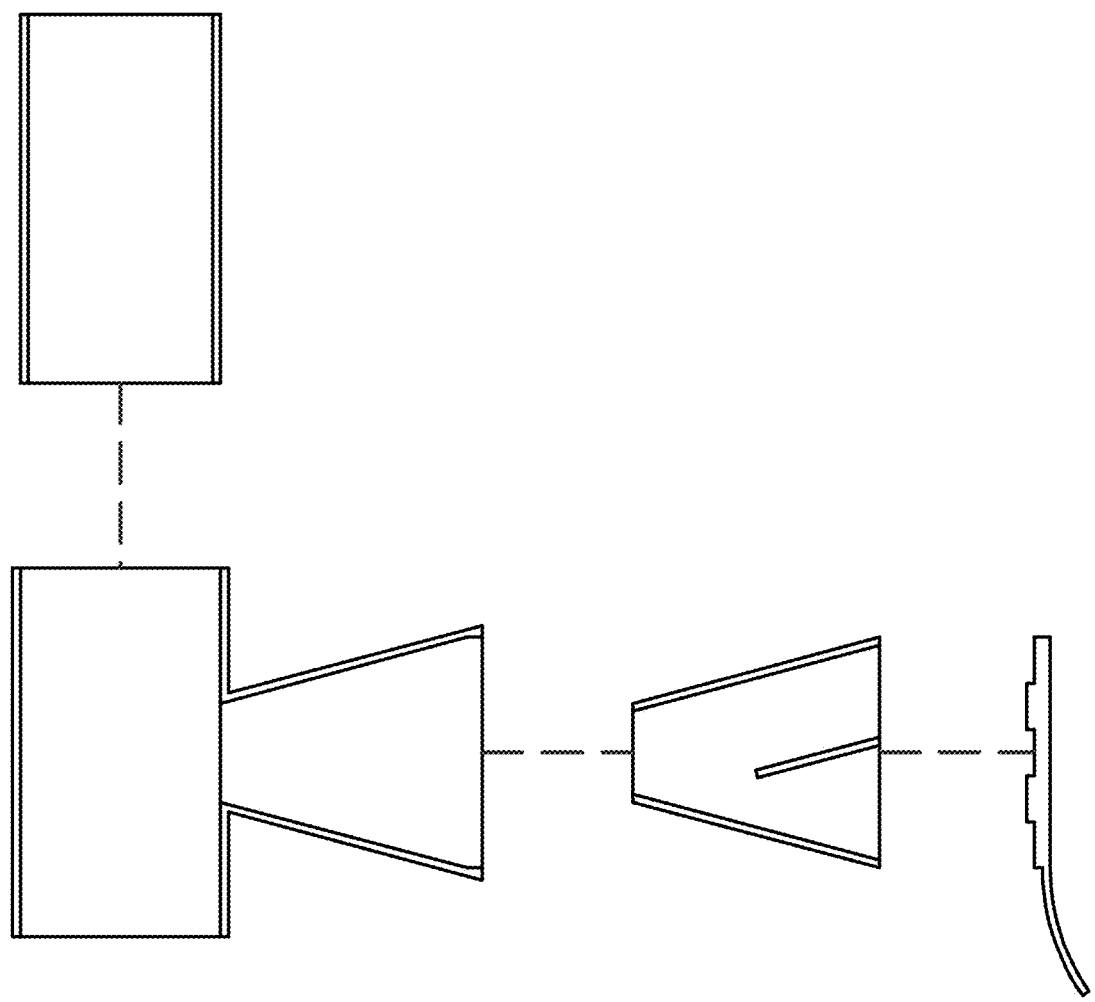
FIG. 20 is a side, sectional, and exploded view of the sensor assembly and seed tube.
Figure 21:
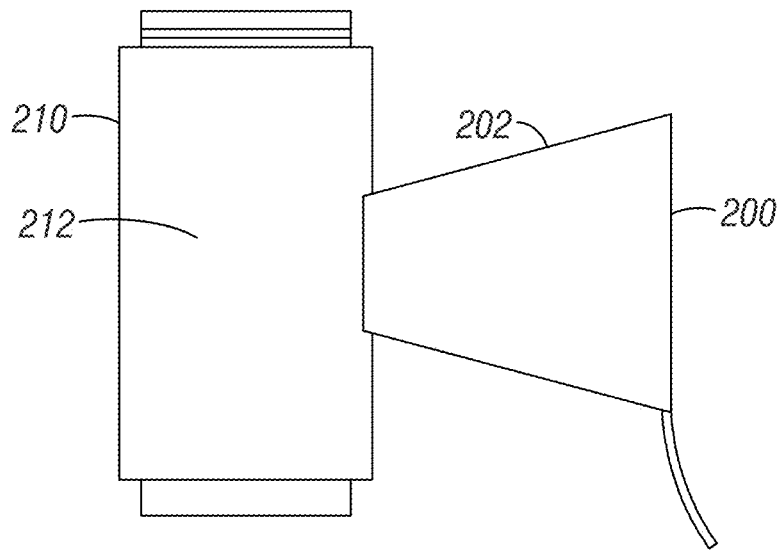
FIG. 21 is a side view of a sensor assembly and a belted seed tube according to aspects of the disclosure.
Figure 22:
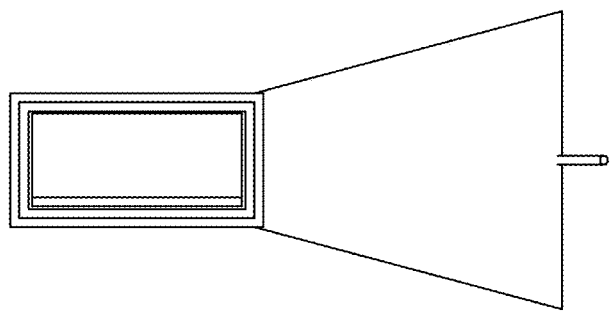
FIG. 22 is a top plan view of the sensor assembly and belted seed tube.
Figure 23:
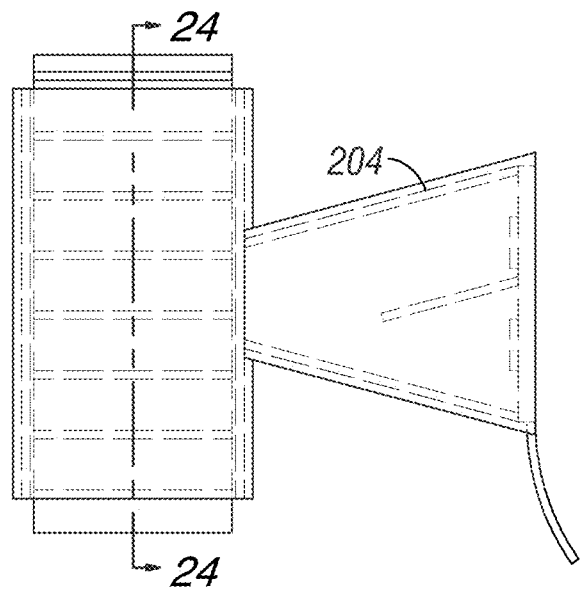
FIG. 23 is a side view showing components of the sensor assembly and belted seed tube.
Figure 24:
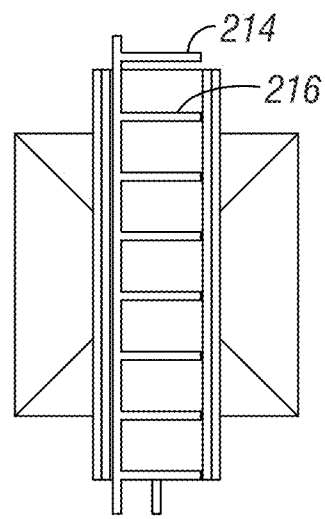
FIG. 24 is a sectional view taken along line 24-24 of FIG. 23.
Figure 25:
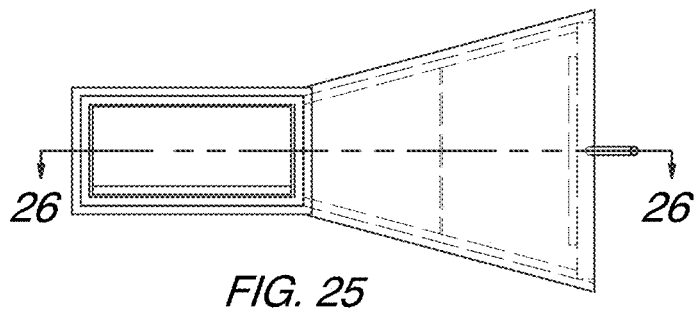
FIG. 25 is a tope view of the components of the sensor assembly and belted seed tube.
Figure 26:
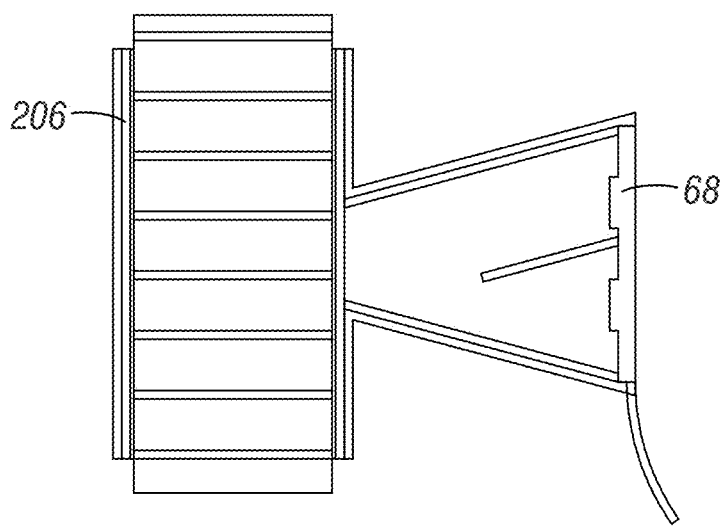
FIG. 26 is a sectional view taken along line 25-25 of FIG. 24.
Figure 27:
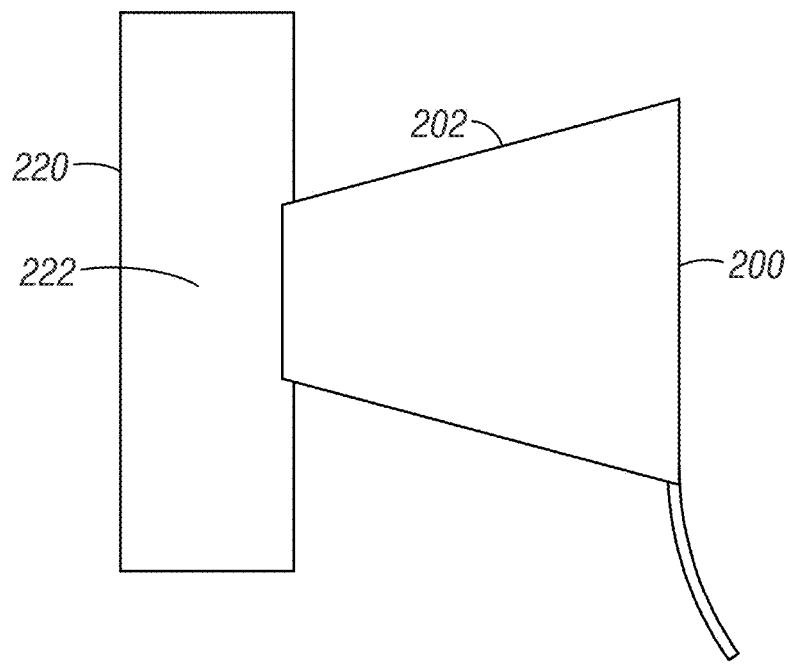
FIG. 27 is a side elevation view of a sensor assembly connected to a pneumatic seed tube according to aspects of the disclosure.
Figure 28:
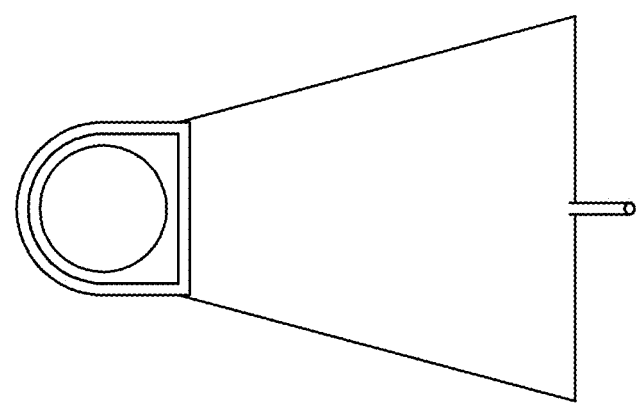
FIG. 28 is a top plan view of the sensor assembly and pneumatic seed tube.
Figure 29:
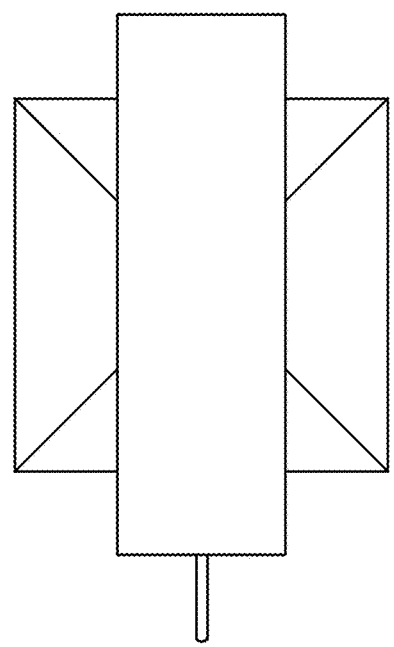
FIG. 29 is front elevation view of the sensor assembly and pneumatic seed tube.
Figure 30:
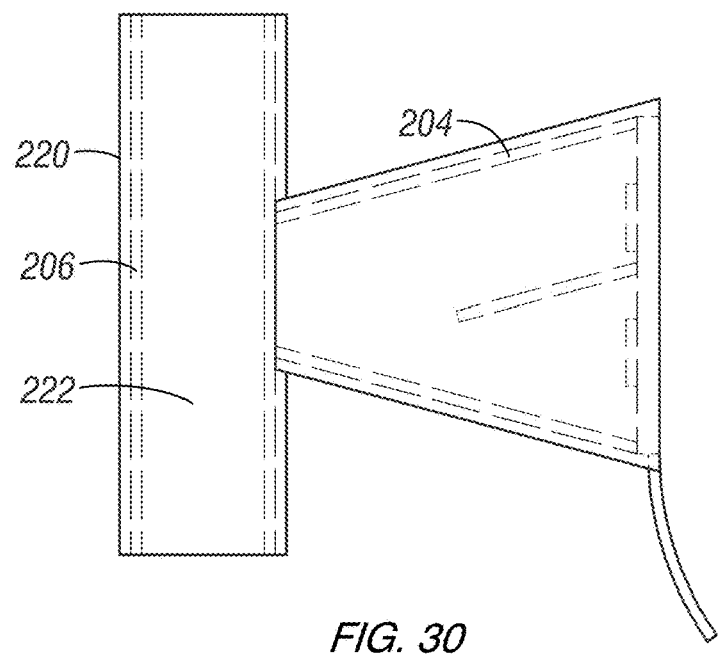
FIG. 30 is a side view showing the components of the sensor assembly and pneumatic seed tube.
Figure 31:
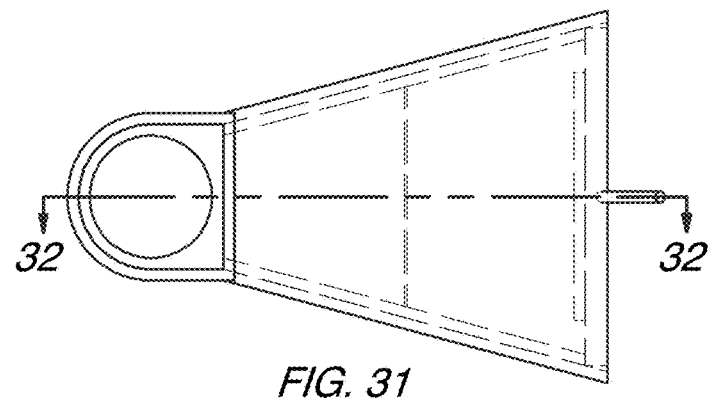
FIG. 31 is a top view showing the components of the sensor assembly and pneumatic seed tube.
Figure 32:
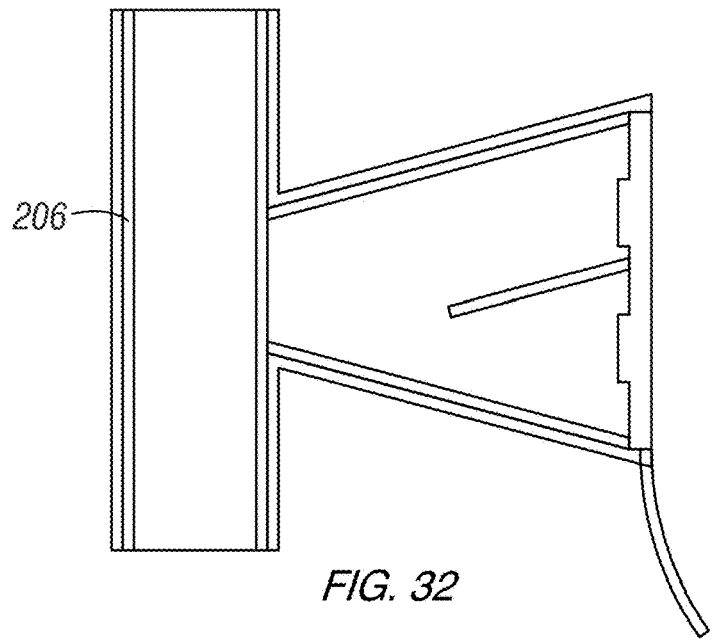
FIG. 32 is a side sectional view of the sensor assembly and pneumatic seed tube taken along line 32-32 of FIG. 31.

Therefore, as shown in FIGS. 13-22, and in particular in FIG. 18, where a section of the seed tube 58 is shown, the liner 206 is positioned in the seed tube 58 at or near the area where the FOV of the sensor 68 will be directed. The sensor is positioned within a housing 202 that may include tapered sides. The tapered sides of the housing 202 are lined with the material 204 in such a manner that the waves from the radar sensor 68 are directed towards the seed tube 58, and in particular, towards the area of the seed tube 58 that is lined with the absorbing material 206. However, the tunnel could be any shape, size, etc. to aid in narrowing and/or directing the FOV of the radar. As shown in the figures, the seed tube 58 is square or rectangular shaped, but this is not to be limiting on the disclosure.

FIGS. 21-26 show another exemplary embodiment of the sensor assembly 200 being connected to a seed delivery mechanism, which in these claims may be referred to as a belted seed tube 210. The belted seed tube 210 includes a housing 212 with a flighted belt 214 passing therethrough. The belt includes a plurality of spaced flights or ledges 216, which are used to receive seed and to transport the seed towards the furrow. The sensor assembly 210 is used to determine that a seed has been delivered by the belt and can also be used to determine the spacing between subsequent seeds.

The sensor 68 can be placed in the same housing 202 with the tunnel that can be any shape, as previously disclosed. The housing can also be lined with a material 204 to aid in controlling the FOV of the radar emanating from the sensor 68, which will be towards the belt 214.

The seed tube housing the belt will also be lined with a material, such as the radar absorbing material 206 as disclosed herein. This can be around the belt but within the housing of the seed tube.

FIGS. 27-32 show yet another embodiment of a seed sensor assembly 200 operatively connected to a seed delivery mechanism, which may be a pneumatic seed tube 220. The pneumatic seed tube 220 includes a housing 222 through which seed is moved. The seed in the housing 222 may be aided in movement by a pneumatic source, such as air by way of positive pressure in a seed meter or by a separate air source (e.g., hose, air pump, fan, compressor, etc.). The sensor assembly 200 is used to determine that a seed has been delivered and can also be used to determine the spacing between subsequent seeds.

The seed sensory assembly 202 can be the same as that previously disclosed herein, and includes the same components (housing, liner, sensor, power source, and communication line, etc.). The components of the assembly are used to direct the waves of the sensor to an area of the pneumatic seed tube 220. The pneumatic seed tube can comprise generally any material, but may comprise a plastic or other like material (silicone, rubber, glass, and/or composite). Furthermore, the tube 220, or at least a portion thereof, may be lined with a radar absorbing material 206, such as that previously disclosed herein. The material will aid in mitigating noise such that the sensor assembly 202 recognizes seeds and other particulate materials passing therethrough, but ignores any extraneous materials. The tube 220 is shown to be circular in nature, but this is not to be limiting on the disclosure and it is to be recognized that generally any shape and size may be utilized. The seed passing through the tube will be recognized by the sensor and communicated to another location (or stored in memory thereat) to determine the accuracy of the seed meter and/or other agricultural operation.

In operation, the sensor uses the Doppler effect to determine the presence of seed or other particulate material. This includes signal processing to translate the speed sensed of the seed to an identified seed event. For example, a seed event may be the presence of a seed passing through the delivery mechanism. A processing unit, such as a computer processing unit, server, or the like, can includes algorithms and/or software.

To determine if a seed event has occurred, a baseline of 1.6 V is the start. A seed event is detected by a higher voltage than the 1.6 V. This can be by way of a wave being above and below the 1.6 V baseline along an X-axis, which is the time of the event, with voltage along the Y-axis. To determine the length of a seed event, first the voltage should be zeroed, such as by the equation V-1.6 V=$V_N$. Next, the absolute value of $V_N$ is found to determine $V_{NX}$, which looks like $V_{NX}$=abs($V_N$).

Next, the voltage over time is determined to find $V_{NXT}$, which is found by taking the value of $V_{NX}$ from 0 to t (where t is time), and dividing this by t.

$$V_{NXt} = \frac{\sum_0^t V_{NX}}{t}$$

Based on this equation, if V is above X, then there has been a seed event. For example, X=0.2 V, with X determined by the noise level.

To determine the equation, an RC circuit can be used to replace the averaging function of the algorithm, with a capacitor and a resistor. A diode can be used to invert the valve to absolute value (diode inverter). This allows for hardware to replace the algorithm to determine a seed event. Such a configuration and/or algorithm can be used for either of the gravity seed tube or the pneumatic seed tube.

For high speed radar detection (flighted belt tube), the absorbing material is zeroed. If there is something else besides this detected, it may be categorized as an anomaly. An algorithm is used to detect change/difference between the flights of the belt and the seed events. The speed of the flights of the belt can be used to determine if a seed is spaced between. For example, an empty belt can be passed through the sensor to determine a baseline. The presence of seed can be then determined. The radar orientation will have no determination to the system.

In addition, a double radar (use of two radars) could be used to provide better resolution, such as with smaller seeds. This would provide seed and distance of an event, which would be used to triangulate the item passing thereby or therethrough.

The seed meter, planter, implement, row unit, or other device using the sensor, and according to the aspects of the present disclosure may also include components such as an intelligent control and communication components. Examples of such intelligent control units may be tablets, telephones, handheld devices, laptops, user displays, or generally any other computing device capable of allowing input, providing options, and showing output of electronic functions. Still further examples include a microprocessor, a microcontroller, or another suitable programmable device) and a memory. The controller also can include other components and can be implemented partially or entirely on a semiconductor (e.g., a field-programmable gate array ("FPGA")) chip, such as a chip developed through a register transfer level ("RTL") design process. The memory includes, in some embodiments, a program storage area and a data storage area. The program storage area and the data storage area can include combinations of different types of memory, such as read-only memory ("ROM"), random access memory ("RAM") (e.g., dynamic RAM ("DRAM"), synchronous DRAM ("SDRAM"), etc.), electrically erasable programmable read-only memory ("EEPROM"), flash memory, a hard disk, an SD card, or other suitable magnetic, optical, physical, or electronic memory devices.

A communications module can be included with the sensor, row unit, implement, seed meter, seed delivery device, etc., and can be configured to connect to and communicate with another controller, such as a computer, tablet, server, or other computing device. This could allow the sensor to provide data or other information (e.g., warnings, status, notices, etc.) associated with the respective member to a remote location to allow the real-time information and stored information for the sensor. The information could be used to determine issues, forecast, or otherwise track information related to the sensor. The communication could also be in the form of inputs such that the communication could include a command to the sensor or other mechanism from a remote location.

In some embodiments, the implement or component thereof connected in part to the sensor includes a first communications module for communicating with a secondary device (other implement, tablet, or other remote controller), and/or a second communications module for communicating with a central location (server, computer, or other master controller). For sake of simplicity, the term "communications module" herein applies to one or more communications modules individually or collectively operable to communicate with a component disclosed herein and the central location.

The communications module communicates with the central location through the network. In some embodiments, the network is, by way of example only, a wide area network ("WAN") (e.g., a global positioning system ("GPS"), a TCP/IP based network, a cellular network, such as, for example, a Global System for Mobile Communications ("GSM") network, a General Packet Radio Service ("GPRS") network, a Code Division Multiple Access ("CDMA") network, an Evolution-Data Optimized ("EV-DO") network, an Enhanced Data Rates for GSM Evolution ("EDGE") network, a 3GSM network, a 4GSM network, a Digital Enhanced Cordless Telecommunications ("DECT") network, a Digital AMPS ("IS-136/TDMA") network, or an Integrated Digital Enhanced Network ("iDEN") network, etc.), although other network types are possible and contemplated herein. In certain embodiments, the network is a GSM or other WAM which is operable to allow communication between the communications module and the central location during moments of low-quality connections, such as but not limited to when the implement is in a better location.

The network can be a local area network ("LAN"), a neighborhood area network ("NAN"), a home area network ("HAN"), or personal area network ("PAN") employing any of a variety of communications protocols, such as Wi-Fi, Bluetooth, ZigBee, near field communication ("NFC"), etc., although other types of networks are possible and are contemplated herein. Communications through the network by the communications module or the controller can be protected using one or more encryption techniques, such as those techniques provided in the IEEE 802.1 standard for port-based network security, pre-shared key, Extensible Authentication Protocol ("EAP"), Wired Equivalency Privacy ("WEP"), Temporal Key Integrity Protocol ("TKIP"), Wi-Fi Protected Access ("WPA"), and the like.

The connections between the communications module and the network are wireless to enable freedom of movement and operation of the mobile implement without being physically tethered to a computer or other external processing device to facilitate such communications. Although such a modality of communications is preferred for at least this reason, it is contemplated that the connections between the communications module and the network can instead be a wired connection (e.g., a docking station for the communications module, a communications cable releasably connecting the communications module and a computer or other external processing device, or other communications interface hardware), or a combination of wireless and wired connections. Similarly, the connections between the implement or components thereof and the network or the network communications module are wired connections, wireless connections, or a combination of wireless and wired connections in any of the forms just described. In some embodiments, the implement, components thereof, and/or communications module includes one or more communications ports (e.g., Ethernet, serial advanced technology attachment ("SATA"), universal serial bus ("USB"), integrated drive electronics ("IDE"), etc.) for transferring, receiving, or storing data.

The communications module can be powered by a dedicated power source, such as a battery, battery pack, or wired power (e.g., AC power socket or other power source). In some aspects of the invention, the communications module can be powered by the same power supply as that of the implement, such as by battery or by wired power. Still further, it is contemplated that the communications module can be powered wirelessly or by power over ethernet.

The central location can include a centrally located computer, a network of computers, or one or more centrally located servers. The central location can be adapted to store, interpret, and communicate data from one or more sensors, and can also interpret the data and communicate the interpreted data to a user.

The foregoing description has been presented for purposes of illustration and description and is not intended to be exhaustive or to limit the invention to the precise form disclosed. The descriptions were selected to explain the principles of the invention and their practical application to enable others skilled in the art to utilize the invention in various embodiments and various modifications as are suited to the particular use contemplated. Although particular constructions of the present invention have been shown and described, other alternative constructions will be apparent to those skilled in the art and are within the intended scope of the present invention.

What is claimed is:

1. A row unit, comprising:
   a seed tube;
   a microwave radar device associated with the seed tube that generates and receives electromagnetic waves;
   wherein signal processing components:
   (a) electronically process the electromagnetic waves according to properties associated therewith, said properties comprising energy, time delay, and frequency shift; and
   (b) generate electronic signals that represent the presence of a seed and characteristics associated therewith, said characteristics comprising size, shape, orientation, material, distance, and velocity of the seed.

2. The row unit of claim 1, wherein the electromagnetic waves have wavelengths of 10 GHz-300 GHz.

3. The row unit of claim 2, wherein the electrical signals are then manipulated to filter noise and outside echoes.

4. The row unit of claim 3, wherein the electrical signal is manipulated to highlight or exaggerate the effect of the passing of the seed in the seed tube.

5. The row unit of claim 4, wherein the electrical signal is further analyzed by digital signal algorithms running on a microprocessor to determine that a seed or seeds are passing by the sensor, said signal processing components optionally comprising said microprocessor.

6. The row unit of claim 5, wherein the electrical signal is sent to a planter via an open collector signal.

7. The row unit of claim 5, wherein the electrical signal utilizes a LIN (Local Interconnect Network) communication protocol.

8. The row unit of claim 5, wherein the electrical signal utilizes a serial communication protocol.

9. The row unit of claim 5, wherein the electrical signal utilizes a CAN bus (Controller Area Network) communication protocol.

10. The row unit of claim 5, wherein the electrical signal utilizes Ethernet.

11. The row unit of claim 1, wherein the microwave radar device comprises multiple radar devices using similar or different radar processing techniques to assist in accurately identifying seed passage or different physical characteristics about the seed.

12. The row unit of claim 1, wherein the seed tube is fabricated from or coated with conductive material that reflects the electronic signals from passing beyond the seed tube.

* * * * *